US010119713B2

(12) United States Patent
Castillo et al.

(10) Patent No.: US 10,119,713 B2
(45) Date of Patent: Nov. 6, 2018

(54) DISTRIBUTED HEATING, VENTILATION, AND AIR CONDITIONING SYSTEM WITH CONCURRENT NETWORK CONNECTIONS AND MULTI-ZONE CONTROL

(71) Applicant: Lennox Industries Inc., Richardson, TX (US)

(72) Inventors: Daniel A. Castillo, Dallas, TX (US); Jayprakash Charavda, Irving, TX (US); Nguyen T. Ho, Highland Village, TX (US); Sunil K. Khiani, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 615 days.

(21) Appl. No.: 14/711,981

(22) Filed: May 14, 2015

(65) Prior Publication Data
US 2016/0209066 A1 Jul. 21, 2016

Related U.S. Application Data

(60) Provisional application No. 62/104,900, filed on Jan. 19, 2015, provisional application No. 62/104,932, filed on Jan. 19, 2015.

(51) Int. Cl.
*F24F 11/00* (2018.01)
*F24F 11/62* (2018.01)
(Continued)

(52) U.S. Cl.
CPC ............ *F24F 11/006* (2013.01); *F24F 11/62* (2018.01); *G05B 15/02* (2013.01); *G05B 19/042* (2013.01);
(Continued)

(58) Field of Classification Search
CPC .. F24F 11/006; F24F 11/0009; F24F 11/0012; F24F 2011/0061;
(Continued)

(56) References Cited

U.S. PATENT DOCUMENTS

| 7,133,748 B2 * | 11/2006 | Robinson | F24F 11/0009 165/208 |
| 2007/0012052 A1 * | 1/2007 | Butler | F24F 11/0009 62/181 |

(Continued)

FOREIGN PATENT DOCUMENTS

WO    WO 2016095118 A1 *  6/2016    ......... H04W 76/023

OTHER PUBLICATIONS

Castillo et al., U.S. Appl. No. 14/712,035, Patent Application "Resilient Operation of a Heating, Ventilation, and Air Conditioning System," filed May 14, 2015.

(Continued)

*Primary Examiner* — Frantz Jules
*Assistant Examiner* — Nelson Nieves
(74) *Attorney, Agent, or Firm* — Baker Botts L.L.P.

(57) ABSTRACT

In one embodiment, a system for managing control units in HVAC network includes a first control unit communicatively coupled to a first plurality of HVAC units and a first interactive display, and the first control unit controls HVAC services for a first zone. A second control unit communicatively coupled to a second plurality of HVAC units and a second interactive display, and the second control unit controls HVAC services for a second zone. The first control unit may detect and connect to the second control unit using a Wi-Fi direct protocol to create an HVAC control network. The first control unit may also determine that the second control unit controls HVAC services for the second zone in response to connecting to the second control unit. The first (Continued)

control unit may also update the first interactive display to show the first and second zones and receive a command from the first interactive display over the HVAC control network to adjust a temperature of the second zone.

12 Claims, 12 Drawing Sheets

(51) Int. Cl.
*G05B 15/02* (2006.01)
*G06F 3/0484* (2013.01)
*H04L 29/08* (2006.01)
*H04L 12/28* (2006.01)
*G05B 19/042* (2006.01)
*H04W 4/70* (2018.01)
*H04W 84/12* (2009.01)
*H04L 1/00* (2006.01)
*F24F 11/30* (2018.01)
*F24F 110/10* (2018.01)
*F24F 11/63* (2018.01)
*F24F 11/64* (2018.01)
*F24F 11/56* (2018.01)
*F24F 11/58* (2018.01)
*F24F 11/52* (2018.01)

(52) U.S. Cl.
CPC .......... *G06F 3/0484* (2013.01); *H04L 12/283* (2013.01); *H04L 12/2823* (2013.01); *H04L 12/2825* (2013.01); *H04L 12/2836* (2013.01); *H04L 67/10* (2013.01); *H04L 67/12* (2013.01); *H04W 4/70* (2018.02); *F24F 11/30* (2018.01); *F24F 11/52* (2018.01); *F24F 11/56* (2018.01); *F24F 11/58* (2018.01); *F24F 11/63* (2018.01); *F24F 11/64* (2018.01); *F24F 2110/10* (2018.01); *G05B 2219/21157* (2013.01); *G05B 2219/25168* (2013.01); *H04L 1/0004* (2013.01); *H04L 2012/285* (2013.01); *H04L 2012/2841* (2013.01); *H04W 84/12* (2013.01)

(58) Field of Classification Search
CPC ....... F24F 2011/0068; F24F 2011/0091; F24F 2011/0071; F24F 11/0086; H04L 12/2823; H04L 12/2825; H04L 12/283; H04L 12/2836; H04L 67/10; H04L 67/12; H04L 1/0004; H04L 2012/2841; H04L 2012/285; G05B 2219/25168
See application file for complete search history.

(56) References Cited

U.S. PATENT DOCUMENTS

| | | | | |
|---|---|---|---|---|
| 2012/0046797 A1* | 2/2012 | Grohman | ............ | F24F 11/0009 700/296 |
| 2012/0253521 A1* | 10/2012 | Storm | ................ | G05D 23/1905 700/276 |
| 2013/0087628 A1* | 4/2013 | Nelson | ................ | F24F 11/0012 236/51 |
| 2013/0166075 A1* | 6/2013 | Castillo | ................ | F24F 11/0012 700/277 |
| 2014/0324231 A1* | 10/2014 | Kawai | .................... | G08C 17/02 700/276 |
| 2015/0044961 A1* | 2/2015 | Sugiyama | ............ | F24F 11/0086 454/258 |
| 2015/0066215 A1* | 3/2015 | Buduri | .................... | G05B 15/02 700/276 |
| 2015/0148965 A1* | 5/2015 | Lemire | .................. | G05B 15/02 700/276 |
| 2015/0248118 A1* | 9/2015 | Li | .......................... | G05B 13/04 700/295 |
| 2015/0369505 A1* | 12/2015 | Malve | .................... | H04W 4/008 700/276 |
| 2016/0265799 A1* | 9/2016 | Matsuno | ................ | F24F 11/006 |
| 2016/0305679 A1* | 10/2016 | Noguchi | .............. | F24F 11/0086 |
| 2017/0023271 A1* | 1/2017 | Nabeshima | .......... | F24F 11/0012 |
| 2017/0038087 A1* | 2/2017 | Nabeshima | .......... | F24F 11/0012 |

OTHER PUBLICATIONS

Castillo et al., U.S. Appl. No. 14/712,066, Patent Application "Diagnosing and Troubleshooting a Heating, Ventilation, and Air Conditioning System," filed May 14, 2015.

Castillo et al., U.S. Appl. No. 14/712,107, Patent Application "Creation and Configuration of a Distributed Heating, Ventilation, and Air Conditioning Network," filed May 14, 2015.

Castillo et al., U.S. Appl. No. 14/712,176, Patent Application "Distributed Heating, Ventilation, and Air Conditioning System," filed May 14, 2015.

Castillo et al., U.S. Appl. No. 14/712,150, Patent Application "Device for Operating a Heating, Ventilation, and Air Conditioning Network," filed May 14, 2015.

Castillo et al., U.S. Appl. No. 14/712,259, Patent Application "Efficient Distribution of Heating, Ventilation, and Air Conditioning Functionality," filed May 14, 2015.

Castillo et al., U.S. Appl. No. 14/712,361, Patent Application "Server Integration with a Heating, Ventilation, and Air Conditioning System," filed May 14, 2015.

* cited by examiner

DISTRIBUTED HEATING, VENTILATION, AND AIR CONDITIONING SYSTEM WITH CONCURRENT NETWORK CONNECTIONS AND MULTI-ZONE CONTROL

CROSS-REFERENCE TO RELATED APPLICATIONS

This application claims the benefit of U.S. Provisional Application Ser. No. 62/104,900 filed on Jan. 19, 2015, entitled "Programmable Smart Thermostat," and U.S. Provisional Application Ser. No. 62/104,932, filed on Jan. 19, 2015, entitled "Method And System For Wireless Control And Monitoring Of Distributed HVAC Systems," both of which are commonly assigned with this application and incorporated herein by reference.

TECHNICAL FIELD

The present invention relates generally to the field of HVAC systems and, more specifically, to operational control of an HVAC network.

BACKGROUND

Heating, ventilation and air-conditioning (HVAC) systems regulate a number of environmental conditions in homes, offices, factories, warehouses, and vehicles. These HVAC systems may include one or more HVAC units to move, cool, or heat air. A thermostat may connect to each HVAC unit over respective communication networks, to provide control to the HVAC units. Operating multiple, siloed communication networks may limit interoperability and lead to a rigid HVAC system.

SUMMARY

In accordance with the present disclosure, disadvantages and problems associated with the operational control of an HVAC system may be reduced or eliminated.

In one embodiment, a system for managing control units in HVAC network includes a first control unit communicatively coupled to a first plurality of HVAC units and a first interactive display, and the first control unit controls HVAC services for a first zone. A second control unit communicatively coupled to a second plurality of HVAC units and a second interactive display, and the second control unit controls HVAC services for a second zone. The first control unit may detect and connect to the second control unit using a Wi-Fi direct protocol to create an HVAC control network. The first control unit may also determine that the second control unit controls HVAC services for the second zone in response to connecting to the second control unit. The first control unit may also update the first interactive display to show the first and second zones and receive a command from the first interactive display over the HVAC control network to adjust a temperature of the second zone.

In some embodiments, a system for controlling an HVAC network includes a first control unit communicatively coupled to a first plurality of HVAC units and a first interactive display, wherein the first control unit controls HVAC services for a first zone. A second control unit communicatively coupled to a second plurality of HVAC units and a second interactive display, wherein the second control unit controls HVAC services for a second zone. The first control unit is operable to detect and connect to the second control unit over a Wi-Fi network. The first control unit may also determine that the second control unit controls HVAC services for the second zone in response to connecting to the second control unit. The first control unit further operable to update the first interactive display to show the first and second zones and receive a command to adjust a temperature of the second zone from the first interactive display.

In certain embodiments, a control unit for managing an HVAC network, includes a first interface operable to facilitate communications with a first plurality of HVAC units, wherein the first plurality of HVAC units provide temperature control for a first zone. A second interface operable to facilitate communication with an interactive display, the interactive display operable to show one or more conditions of the first zone. A Wi-Fi module operable to detect and connect with a sibling control unit using a Wi-Fi direct protocol. The sibling control unit may control a second plurality of HVAC units and the second plurality of HVAC units may provide temperature control for a second zone. A processor communicatively coupled to the first interface, the second interface, and the Wi-Fi module. The processor may update, using the second interface, the interactive display to show the first and second zones upon connecting with the sibling control unit, and receive, over the second interface, a command to adjust a temperature of the second zone from the interactive display.

Certain embodiments of the disclosure may provide one or more technical advantages. One advantage of the present disclosure provides connectivity between independent HVAC systems to enable robust data viewing and equipment control of each HVAC system from multiple user interfaces. Another embodiments provides a user or technician with enhanced control over the HVAC system with little upfront setup or involvement. Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present disclosure and its advantages are best understood by referring to FIGS. 1-12, like numerals being used for like and corresponding parts of the various drawings.

Traditional heating, ventilation, and air-conditioning (HVAC) systems have failed to keep pace with advances in communication, device interoperability, and user connectivity. More advanced HVAC systems have developed an over reliance on Internet availability and centralized control from a dedicated server. Advancements disclosed by the present disclosure provide technical solutions to the technical shortcomings created by the gap in traditional HVAC systems and Internet-dependent systems.

The following figures describe an HVAC system architecture that is capable of operating intelligently in residential, commercial, and industrial environments. Embodiments described herein provide solutions for seamlessly creating and configuring a distributed HVAC system operable to interconnect multiple HVAC units, controllers, and devices. The following offers a brief description of the technical advantages disclosed by the embodiments of the disclosure.

Figure 1:
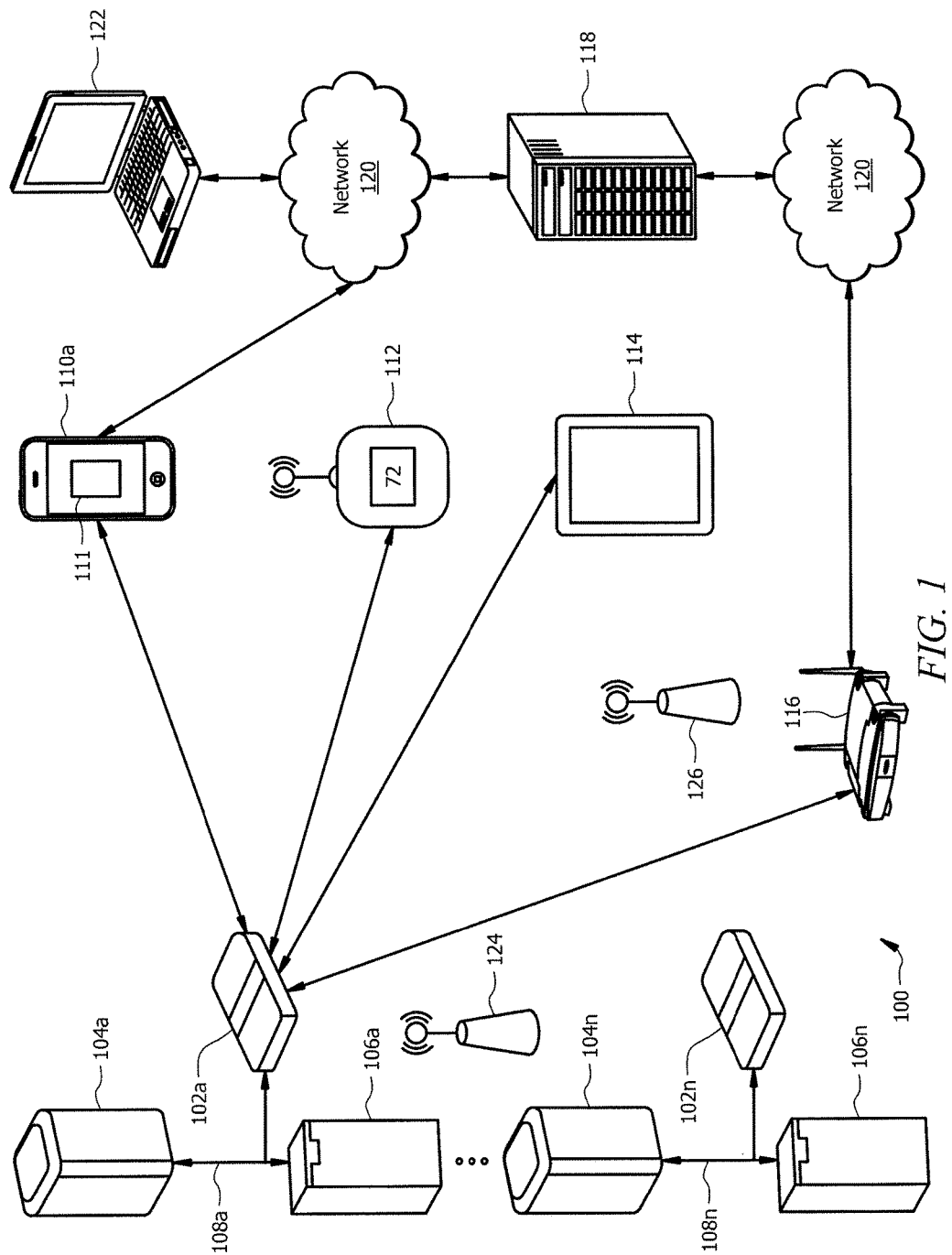
FIG. 1 is an example diagram illustrating components of a heating, ventilation, and air-conditioning (HVAC) system.

FIG. 1 discloses an HVAC network adept at operating multiple HVAC units, sensors, and interactive displays using an intelligent control unit to manage and facilitate communications within an HVAC system.

Figure 2:
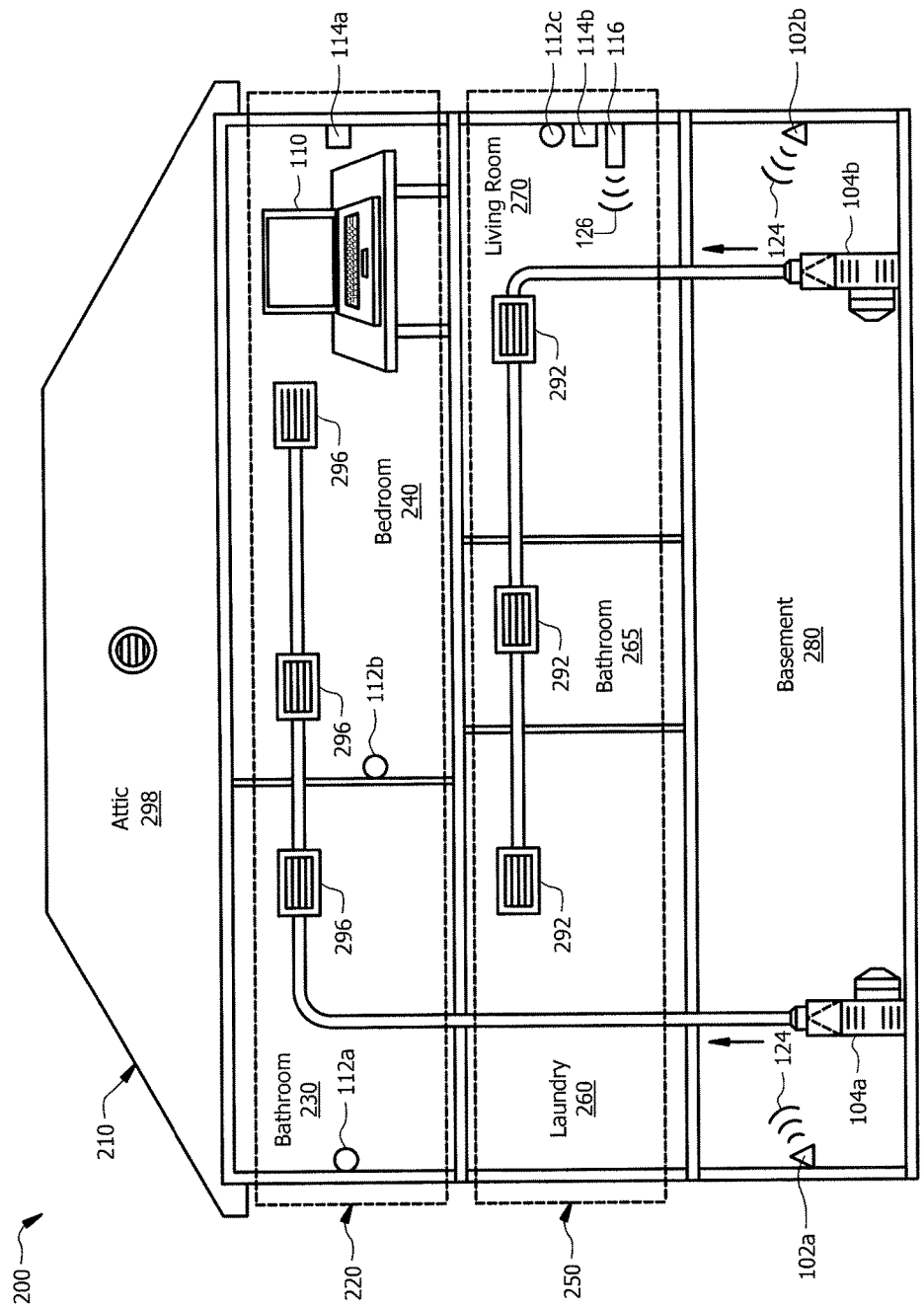
FIG. 2 is a diagram of a residential home illustrating interoperable HVAC units.
Figure 3:
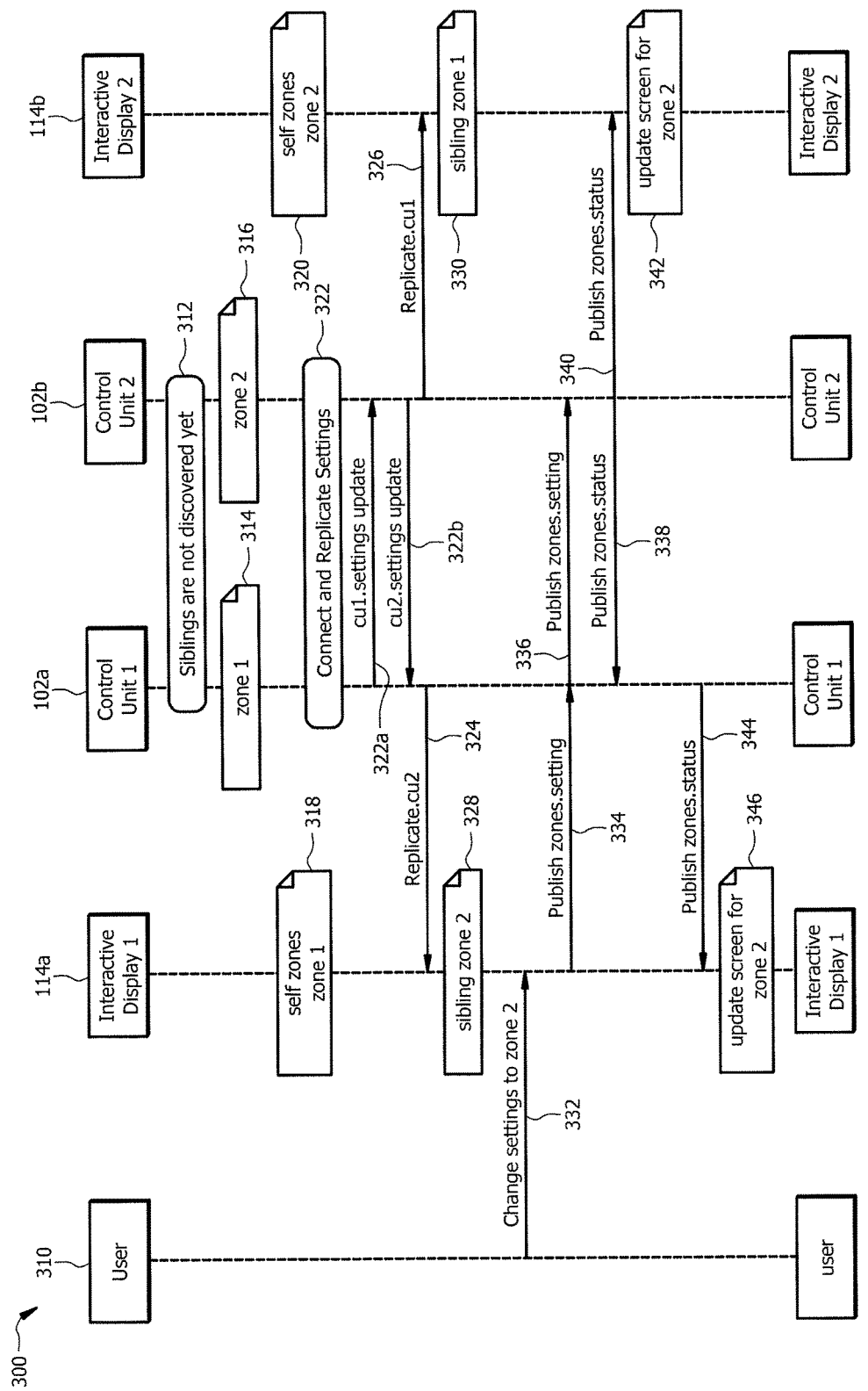
FIG. 3 is an example timing diagram showing how HVAC control units update zone control in an HVAC system.
Figure 4:
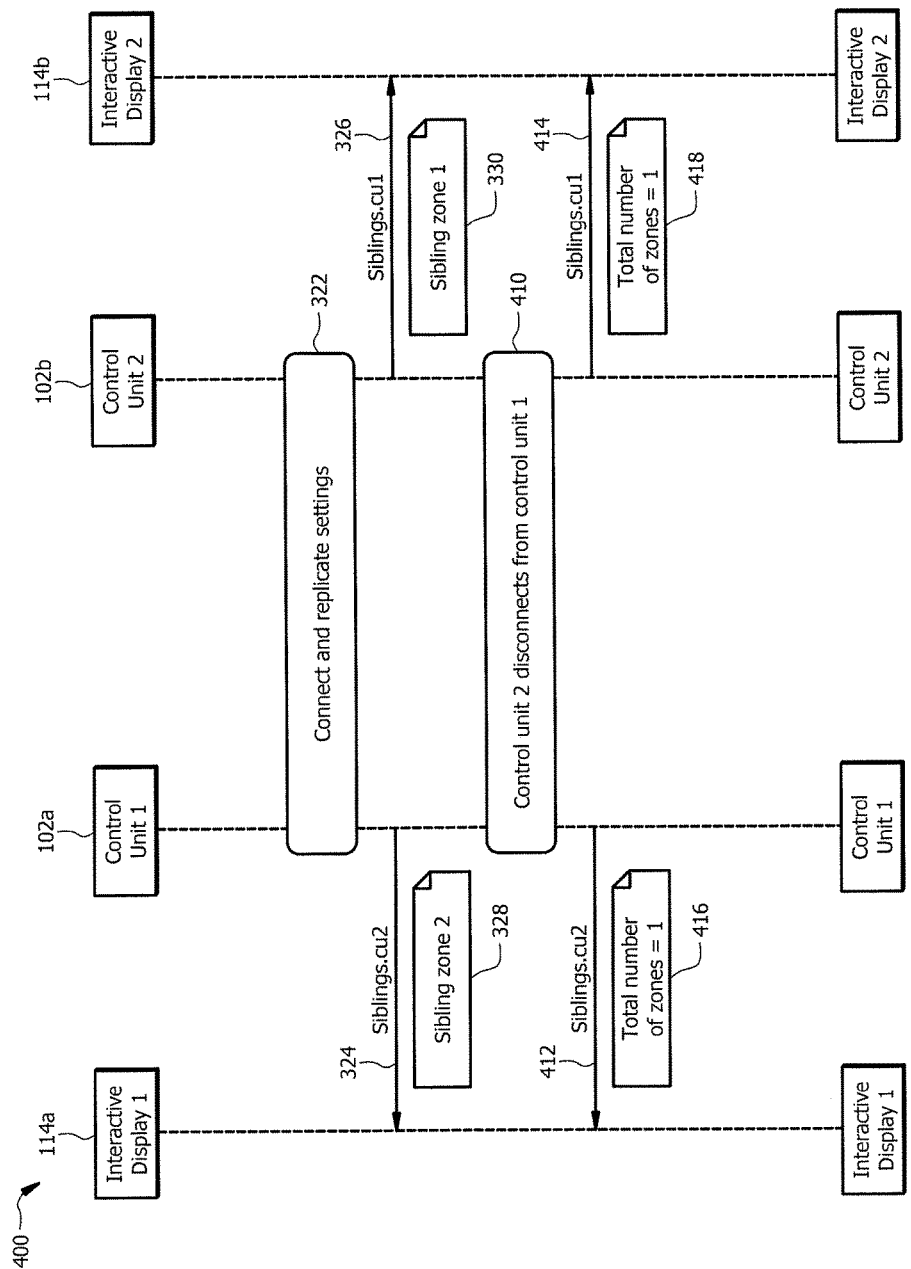
FIG. 4 is an example timing diagram showing how HVAC control units update zone control after losing communication.

FIGS. 2-4 detail how isolated HVAC systems may interface to form a distributed HVAC system. Providing connectivity between independent HVAC systems enables robust data viewing and equipment control of each HVAC system from multiple user interfaces.

Figure 5:
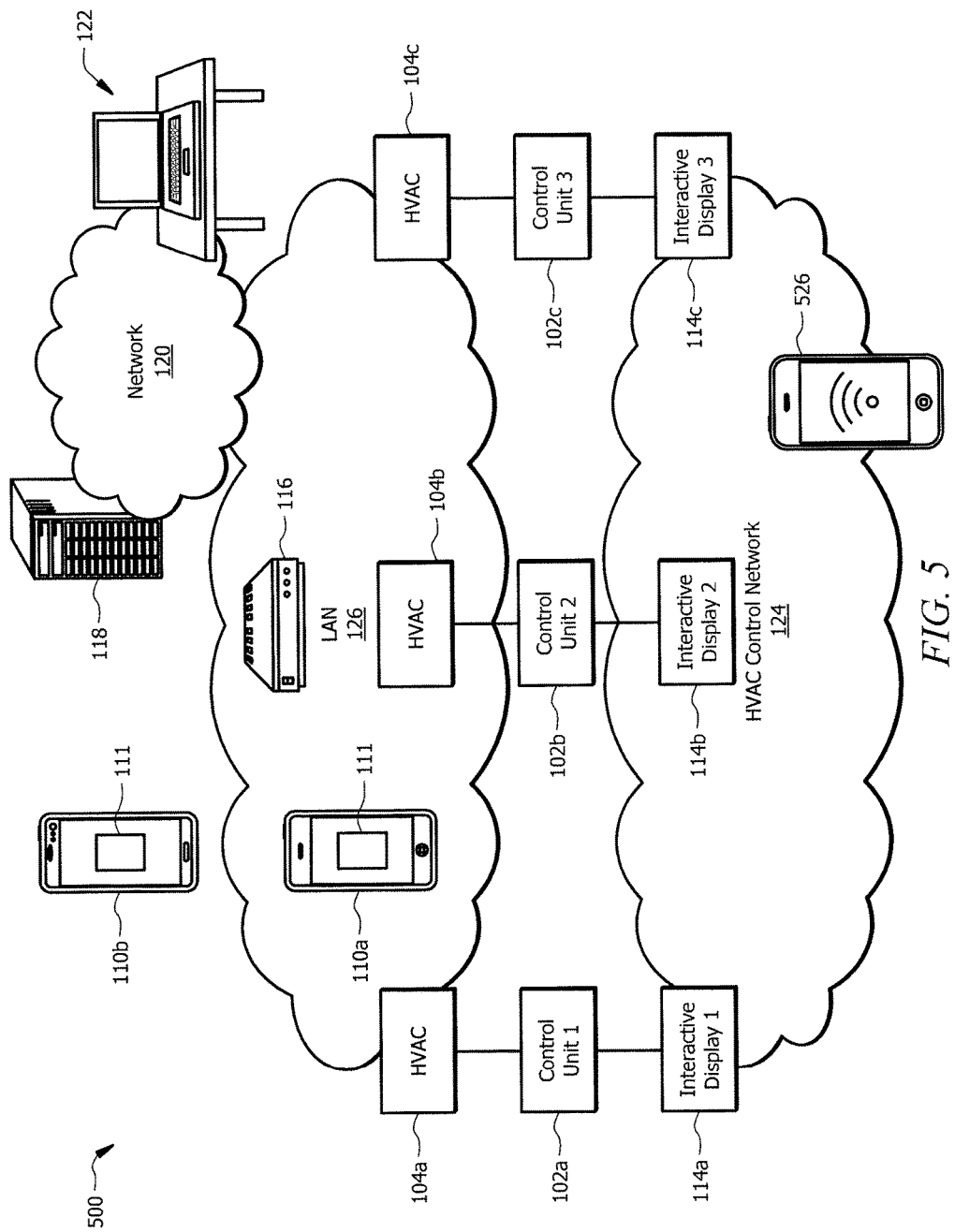
FIG. 5 illustrates example operations of HVAC devices in an HVAC system having multiple communication networks.
Figure 6:
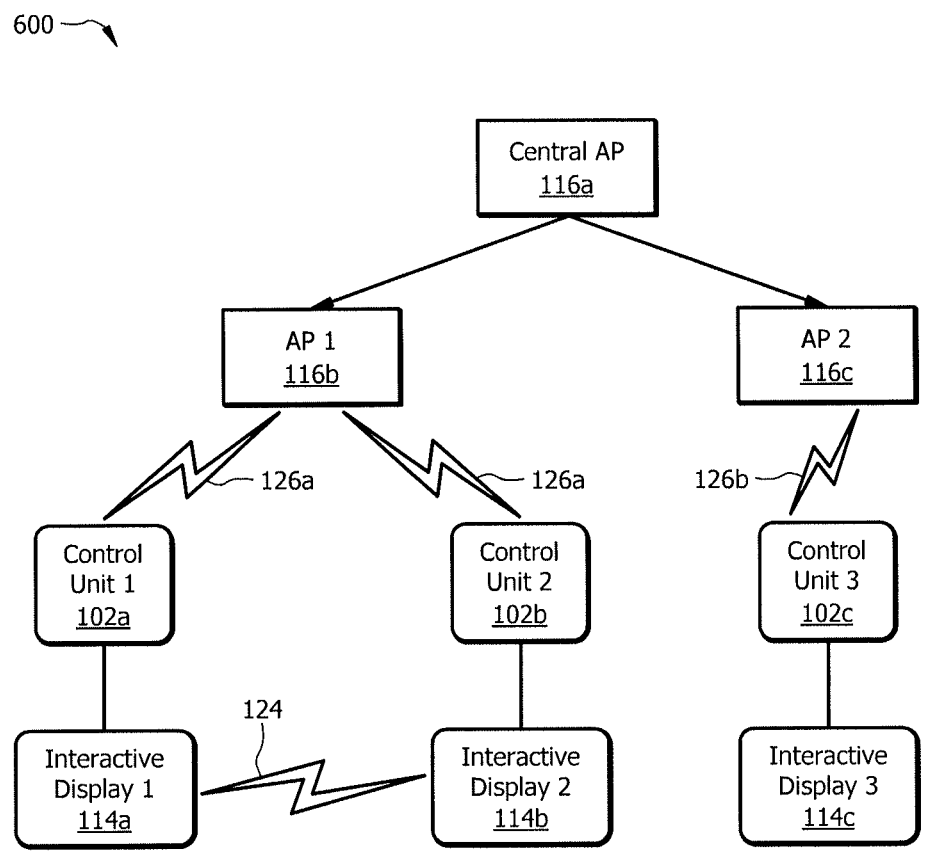
FIG. 6 is an example diagram depicting a distributed HVAC system using multiple access points to facilitate communication.

FIGS. 5-6 discuss the creation of a self-sufficient, resilient HVAC network that provides wireless connectivity between HVAC devices and user interfaces without depending on a centralized server for operation. These advantages are realized by overcoming technical issues involved in the detection and switching between communication networks to ensure a reliable communication backbone for HVAC system communication. Another advantage is the automatic identification of network members using layered security protocols such as small acceptance windows, built-in passwords, and application level ID pre-filtering.

Figure 7:
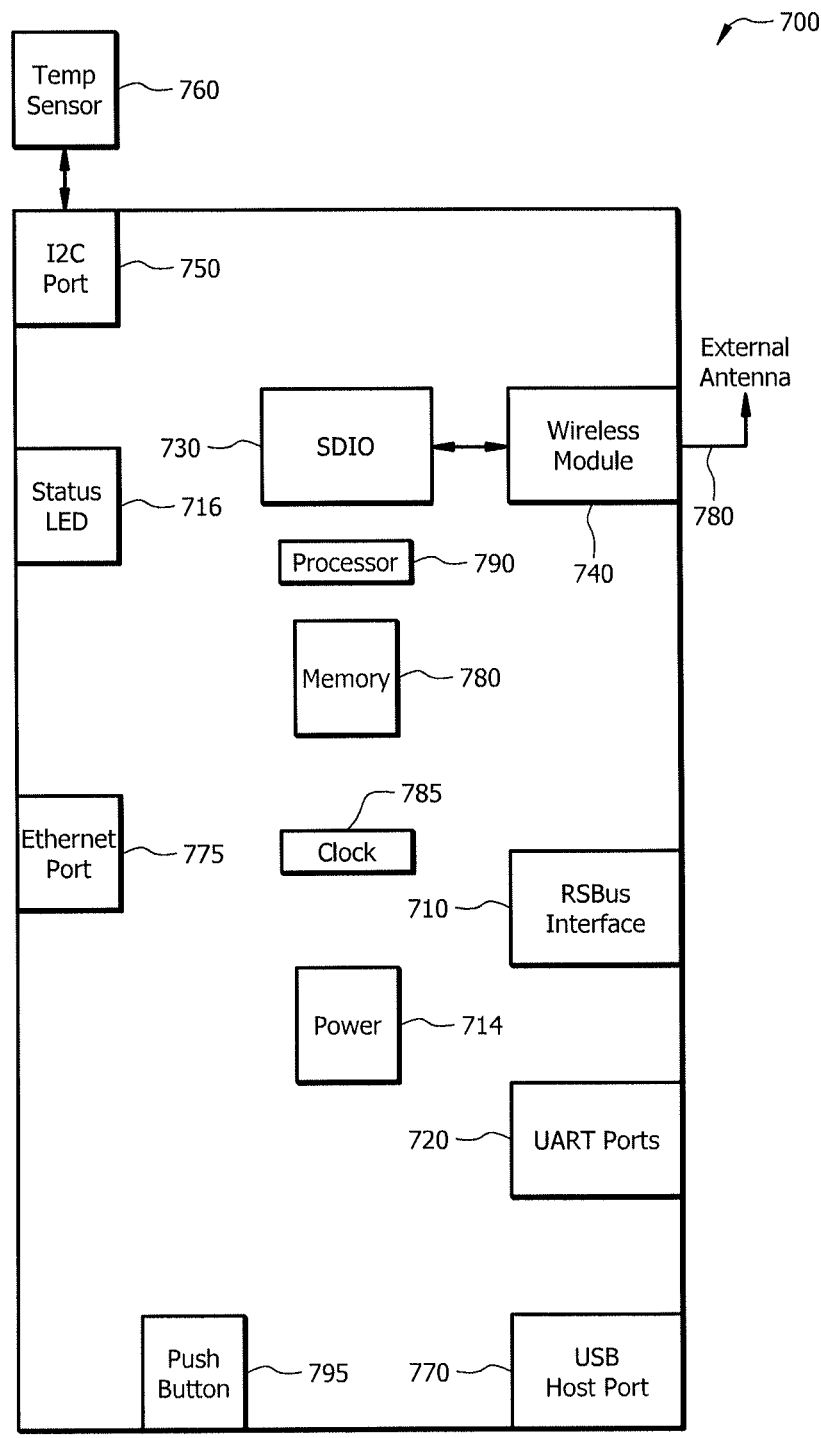
FIG. 7 is a block diagram illustrating an example HVAC control unit.
Figure 8:
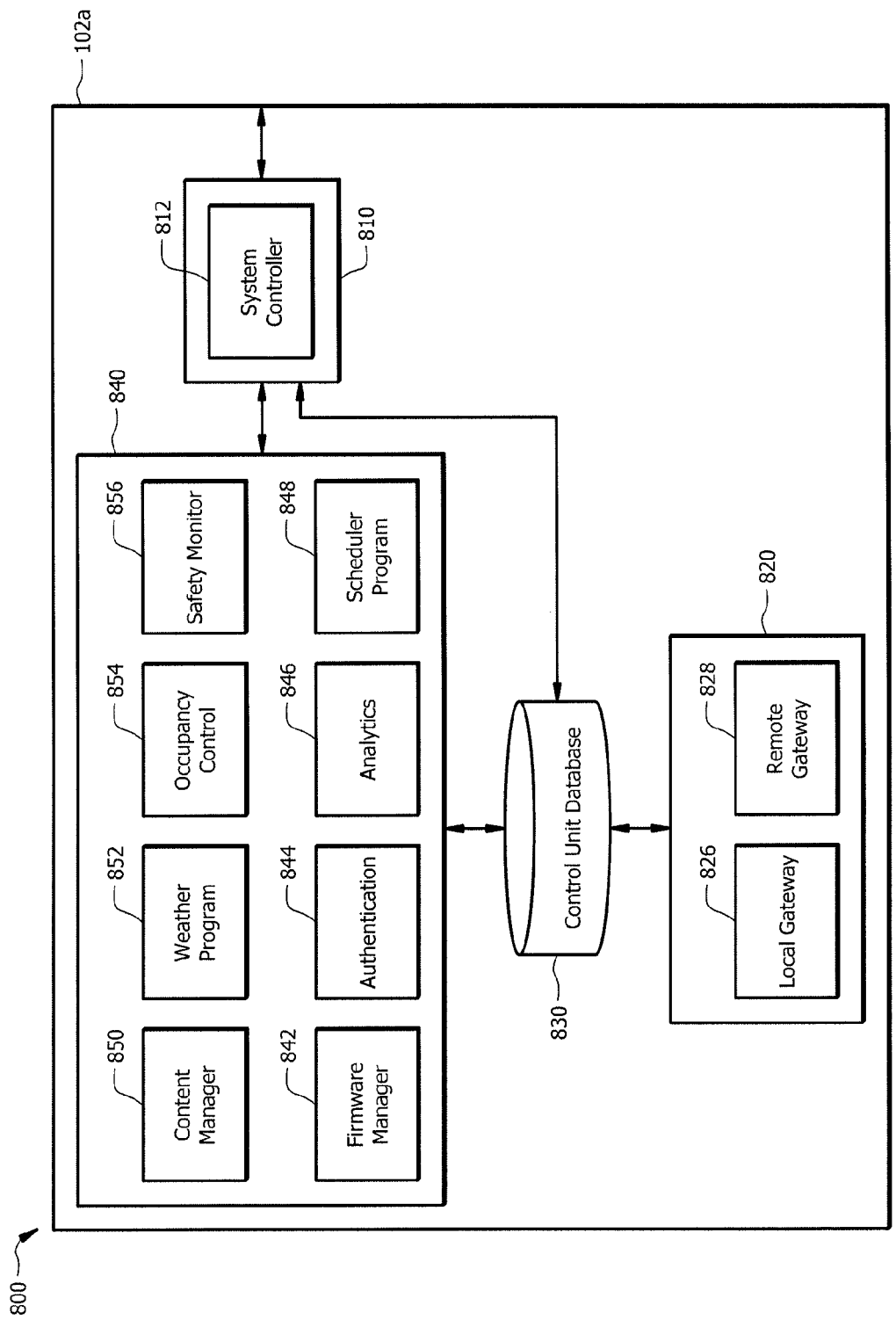
FIG. 8 is a block diagram illustrating example control systems and applications provided by an HVAC control unit.

FIGS. 7-8 describe the technical details of the hardware, interfaces, and applications that enable a control unit to provide integrated control and management of an HVAC system. Novel features of the control unit overcome a number of technical issues present in traditional HVAC networks such as the siloed operation of multiple HVAC units in a single system. The solutions described below may allow for pan-HVAC communications using a reliable wireless service that also provides easy onboarding to existing wireless networks.

FIGS. 9-12 explain a number of technical advantages created when an HVAC control unit is augmented with services from an HVAC server. Embodiments explain how control units in an HVAC system may overcome limited communication resources to interface with an HVAC server to provide enhanced troubleshooting abilities and expanded access to user applications.

The advantages described herein overcome technical problems present in current HVAC systems. For example, current residential HVAC systems may have two or more HVAC units providing services to different areas of a home. Traditionally, these HVAC units operate independently and require installers to wire each HVAC unit to a respective thermostat to control separate portions of the home. This configuration forces the homeowner to set the temperature of each thermostat independently to control each HVAC unit. If the homeowner wants to view and control the entire HVAC system, if even possible, an external server first collects the data over the Internet before presenting it to the homeowner.

It is therefore advantageous to provide an HVAC system that facilitates communication amongst multiple HVAC units, allowing users to view and control their entire HVAC system from multiple locations and devices. Embodiments of the present disclosure provide technical improvements in both the communication among HVAC systems and among HVAC system components. Further advantages allow for increased scalability of HVAC systems by using unique communication protocols between HVAC control units.

For example, a homeowner may have a home HVAC system with an outdoor air conditioning unit and an indoor furnace. The air conditioner and the furnace may connect to a control unit, which manages and facilitates communications with other devices in the HVAC system. The control unit may communicate with one or more wireless sensors throughout the home to identify a temperature in each room of the house. The control unit may relay this information to an interactive display, which may provide thermostat capabilities. Additionally, the control unit may connect to one or more homeowner devices such as a mobile phone or a tablet. This ability gives the homeowner greater flexibility in adjusting and monitoring the entire home HVAC system.

As described below, the control unit may provide these services in a non-obtrusive manner, using existing communication networks within the home reinforced by an independent HVAC network. Creating a reliable communications foundation allows users to build on the existing HVAC system. Thus, the homeowner may wish to install an additional air conditioning unit to service a second story. The new air conditioning unit may connect to a second control unit. Once setup, the existing control unit may automatically detect and connect to the new control unit to provide the user control over the entire HVAC system from a single location using a mobile device or an interactive display.

Certain embodiments of the disclosure may include none, some, or all of the above technical advantages. One or more other technical advantages may be readily apparent to one skilled in the art from the figures, descriptions, and claims included herein. The foregoing summaries will now be explained in greater detail using a number of embodiments, figures, and examples.

HVAC System Overview

FIG. 1 is an example HVAC system 100 illustrating components of a heating, ventilation, and air-conditioning (HVAC) network. System 100 comprises control units 102, each communicatively coupled to one or more HVAC units 104 and 106. System 100 may include a single control unit 102a or multiple control units 102a-n. Control units 102 may communicate with user devices 110, sensors 112, interactive displays 114, control server 118, and remote device 122 over HVAC control network 124 and local area network (LAN) 126. LAN 126 may connect with network 120 using access point 116 to provide additional communication avenues for devices in HVAC system 100 to communicate with control server 118 and remote device 122.

Control unit 102a represents any ports or connections, real or virtual, including any suitable hardware and/or software, including protocol conversion and data processing capabilities to facilitate communication between RSBus 108a and other wired and wireless components of HVAC system 100. For example, control unit 102a may facilitate communication between interactive display 114 and HVAC unit 104a by receiving a control command from interactive display over LAN 126 and communicating the command to HVAC unit 104a using RSBus 108a. Furthermore, control unit 102a may communicate with other control units 102b-n that may be present in HVAC system 100. As explained in detail in FIGS. 7 and 8, control unit 102a may comprise a number of interfaces and ports to facilitate communication between HVAC units 104a and 106a and the other elements of system 100. Furthermore, one or more applications may operate to control and process data between devices in HVAC system 100.

HVAC units 104a and 106a represent any HVAC components that provide HVAC services in HVAC system 100. HVAC services may include, but are not limited to, heating, cooling, humidification, dehumidification, and air circulation. For example, HVAC system 100 may be a residential HVAC system. In this example, HVAC unit 104a may represent an air conditioning unit that may include a compressor and condenser coils. HVAC unit 106a may be a furnace for providing heat to the home.

In some embodiments, HVAC units 104a and 106a may be part of a commercial refrigerant system or an industrial HVAC system. Although the illustrated embodiment shows that control unit 102a communicates with both HVAC unit 104a and HVAC unit 106a over RSbus 108a, control unit 102a may communicate with a single HVAC unit or multiple HVAC units.

RSBus 108 communicatively couples control unit 102 with one or more HVAC units 104 and 106. As explained in FIGS. 7 and 8, RSBus 108 may be wired or wireless. In one embodiment, RSBus 108a is a wired serial bus providing communications between control unit 102a and HVAC units 104a and 106a. RSBus 108a may also connect control units 102a-n. In certain embodiments, RSBus 108a operates using Controller Area Network (CAN) transceivers. RSBus 108 may implement a 2-, 3-, or 4-wire network. Depending on the environment of system 100 (i.e., residential, industrial, commercial), RSBus 108 may use different protocols to communicate between HVAC units 104a, 106a and control unit 102a. RSBus 108 may use an RS-BUS protocol in a home HVAC system. In a commercial refrigeration system, control unit 102a may communicate over RSBus 108 using a universal asynchronous receiver/transmitter (UART) to transmit using a communication standard such as RS-232, RS-422, and RS-485.

Although illustrated as a wired connection, RSBus 108a may be a wireless bus communicating between HVAC units 104a, 106a and control unit 102a. RSBus 108a may use any suitable number of wireless or optical communication protocols depending on the environment of system 100, including Bluetooth, ZigBee, an 802.11 standard, or any other appropriate protocol. In some scenarios, RSBus 108 represents an Ethernet or fiber optic connection between HVAC units 104a, 106a and control unit 102a. In certain embodiments, RSBus 108 may operate using HVAC control network 124 and LAN 126.

User device 110 represents one or more laptops, personal computers, monitors, display devices, handheld devices, smartphones, user input devices, or other suitable components for enabling a user to interact with control unit 102a in system 100. User device 110 may connect with control unit 102a using an application 111 on a graphical user interface (GUI) provided by user device 110. The GUI may display application 111 allowing a user to interact with control device 102a instead of using interactive display 114. Control unit 102a may communicate alerts, messages, and notices to user device 110. For example, control unit 102a may detect that HVAC unit 104a needs service. Control unit 102a may transmit the service notice to user device 110a to notify the HVAC unit owner of the need to service HVAC unit 104a.

Sensor 112 represents any device capable of providing environmental and operational data to control units 102. For example, sensors 112 may comprise temperature sensors, humidity sensors, and carbon monoxide detectors. Commercial or industrial HVAC systems may include heat pump temperature sensors, industrial fan sensors, a refrigeration defrost sensor, and air quality sensor, or any other suitable device operable to detect and communicate environmental and operational conditions. Sensors 112 may combine one or more sensors and detectors within a single sensor 112.

Control unit 102a may communicate with sensors 112 to receive data about the location of sensor 112. For example, sensors 112 in a home HVAC system may provide environmental data including ambient temperature, humidity, and carbon monoxide level. In some embodiments, sensor 112 may detect the noise level of the room and prioritize HVAC services to rooms currently being used. As explained in detail in FIGS. 2 and 8, control unit 102a may include one or more applications 840 that interact with the devices of HVAC system 100 to provide intelligent, targeted HVAC services. Embodiments of the present disclosure may lead to a reduction in energy consumption through adaptive scheduling of HVAC units 104 and 106.

As described in FIG. 2, HVAC system 100 may be implemented in a home. Sensors 112 may be placed throughout parts of HVAC system 100. Control unit 102a may receive environmental data from sensors 112 located in a master bedroom, living room, kitchen, and basement. In some embodiments, the location of sensors 112 correspond to specific zones in the home. For instance, a first floor may be designated as a first zone having sensors 112a, 112b, and 112c, while a second floor may be designated as a second zone having sensors 112d, 112e, and 112f. Control unit 102a may recognize which sensors 112a-f are associated with which zone, and may control an HVAC unit 104a specifically targeted to the proper zone.

Interactive display 114 represents any device that allows a user to view and interact with control units 102, HVAC units 104 and 106, and sensors 112. Interactive display 114 may show a variety of information to the user. For example, interactive display 114 may show the ambient temperature measured by sensors 112 as well as the rooms and zones control units 102 service. Interactive display 114 may also display information about HVAC units 104 and 106 such as their respective operating capacities, HVAC dealer information, and expected useful lifetime. Interactive display 114 may also allow a user to setup an operating schedule for control units 102. For example, a user may select the temperature range for each zone to maintain during different times of the day.

Interactive display 114 may be any device operable to display information regarding system 100. For example, interactive display 114 may be a touch screen with a liquid crystal or OLED display. In certain embodiments, interactive display 114 corresponds to a specific control unit 102. However, as discussed in FIGS. 2 and 3, embodiments of the present disclosure may allow each interactive display 114 to communicate with other control units 102 in HVAC system 100. Although described in an example embodiment as a touch screen device, interactive display 114 may be any device that allows a user to interact and control HVAC unit 104a and 106a.

Control server 118 may be a network server, remote server, mainframe, host computer, workstation, web server, personal computer, file server, or any other suitable device operable to communicate with control units 102, user device 110, remote device 122 and process data. Control unit 102a may communicate with control server 118 using network 120 by connecting to access point 116 using LAN 126. Once connected, control server 118 may register control unit 102a and upload control unit 102a with updated firmware. Control server 118 may also facilitate communication between user device 110 and control unit 102a when user device 110 is operating remotely. For instance, if a user is at work and wishes to set the temperature of his home, the user may transmit a temperature set point to control server 118 over network 120. Control server 118 may then communicate the temperature set point to control unit 102a. As explained in FIGS. 9-12, control server 118 may provide a number of services to enhance the operation of control units 102 and facilitation communications with user devices 110 and remote device 122.

Remote device 122 represents one or more laptops, personal computers, monitors, display devices, handheld devices, smartphones, user input devices, or other suitable components for enabling a remote user to interact with control units 102 in system 100. As described in FIGS. 2 and 5, remote device 122 can be used by an HVAC dealer to communicate with control server 118 and control unit 102a to troubleshoot issues in HVAC system 100. The HVAC dealer may communicate with control server 118 using remote device 122 to identify operating parameters associated with HVAC unit 104a and 106a. In some embodiments a technician may use remote device 122 to connect with control unit 102a to diagnose issues with HVAC units 104a and 106a. In certain embodiments, a user may access remote device 122 to log into HVAC system 100 from a remote location such as an office building.

Access point 116 represents any device that allows control units 102, user device 110, sensors 112, and interactive display 114 to connect to network 120 using LAN 126. In some embodiments, LAN 126 is a wireless LAN (WLAN). Access point 116 may use any appropriate communication standard to facilitate the networking of devices in HVAC system 100. Access point 116 may be a wireless access point using a Wi-Fi (IEEE 802.11), Bluetooth, ZigBee (IEEE 802.15.4), Near Field communication (NFC), WiMAX (IEEE 802.16) standard or any other suitable communication standard. As described in FIG. 6, HVAC system 100 may comprise one or more access points 116 to provide greater coverage for a geographically disperse HVAC system. Furthermore, access point 116 may include one or more wireless extension points (not shown) to extend the range of LAN 126. In some embodiments, access point 116 may connect with or include a router and Ethernet switch, thus providing devices connected to LAN 126 with access to network 120.

HVAC control network 124 represents any suitable communication network that facilitates the exchange of data among control units 102 and the other devices of HVAC system 100. In some embodiments, control units 102 may establish HVAC control network 124 without the need for additional, external equipment. For example, HVAC control network 124 may use a number of wireless communication standards such as Wi-Fi Peer-to-Peer (P2P) (i.e., Wi-Fi Direct), Wi-Fi Protected Setup (WPS), Wi-Fi Simple Configuration (WSC) Push Button Configuration, and IEEE 802.11 g/n. As described in FIG. 5, HVAC control network 124 may operate as a wireless ad-hoc network requiring minimal configuration to establish efficient communication links between control units 102 and other devices in HVAC system 100. One or more devices in HVAC system 100 may include hardware and software that allow the devices to operate as software enabled access points (SoftAP). For instance, control units 102 may be embedded with a softAP to facilitate Wi-Fi direct communication between other devices in HVAC system 100, thus creating HVAC network 124. For example, control unit 102a may communicate with control unit 102b to establish HVAC control network 124 by communicating using a Wi-Fi direct protocol, optimized link state routing protocol (OLSR), destination-sequenced distance vector routing (DSDV), or any other suitable communication protocol.

As explained in FIGS. 5-6, control units 102 may establish and communicate over HVAC control network 124 even if access to network 120 is unavailable. Once control unit 102a connects with control unit 102b using HVAC control network 124, control unit 102a may detect the presence of HVAC units 104b and 106b, which may be communicatively coupled to control unit 102b over RSBus 108b. Control units 102 may also use HVAC control network 124 to communicate over HVAC control network 124 with interactive display 114, sensors 112, and user device 110. Accordingly, HVAC control network 124 may allow system 100 to be a robust distributed HVAC system capable of communication and interaction with multiple control units 102.

In addition to communicating using HVAC control network 124, control unit 102a may communicate with control unit 102b as well as user devices 110, sensors 112, and interactive display 114 using LAN 126 created by access point 116. In some embodiments, control unit 102a may operate concurrently over HVAC control network 124 and LAN 126. As explained in FIGS. 5-6, operating over concurrent communication channels may create a resilient HVAC system that provides unique communication and troubleshooting solutions to issues typically found in HVAC systems.

Network 120 represents any suitable network operable to facilitate communication between access point 116, control server 118, remote device 122, and user device 110. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline, fiber-optic, or wireless network, an enterprise intranet, or any other suitable communication link, including combinations thereof operable to facilitate communication between the components.

Modifications, additions, or omissions may be made to system 100 without departing from the scope of the disclosure. For example, in certain embodiments system 100 may lack a access point 116. Control unit 102a may include an Ethernet port to connect to network 120 without the use of access point 116. In another embodiment, HVAC control network 124 may be Wi-Fi hotspot. Any suitable logic may perform the functions of system 100 and the components within system 100.

Initializing and Configuring HVAC System 100

To illustrate the advantages of HVAC system 100, the following figures and examples provide a number of technical benefits that improve the operation and communication of control units 102, HVAC units 104, and other devices in HVAC system 100. As FIGS. 2-4 detail, when control units 102 identify and connect to one another in HVAC system 100, it is beneficial for control units 102 to exchange their preexisting knowledge of HVAC system 100. By exchanging and replicating settings that are universal to HVAC system 100, control units 102 may streamline the installation of complex, distributed systems. By sharing information through HVAC system 100, user updates may replicate across all control units 102 simply by implementing changes on an individual system. Furthermore, operational updates received from control server 118 or manual uploads from a USB connection may be disseminated throughout HVAC system 100, reducing the communication resources that would otherwise be spent connecting to each control unit 102 in HVAC system 100.

To illustrate the advantageous operation of HVAC system 100, FIG. 2 describes how control units 102 may operate in a residential environment to provide an efficient distribution of system parameters and configure responsibilities for providing HVAC services. FIG. 2 is an example diagram 200 of a home 210 having interoperable HVAC control units 102. Embodiments of FIG. 2 provide novel solutions to the provisioning and controlling of multiple zones in home 210 by using a distributed HVAC system 100, regardless of how many control units 102a-n service the system.

To visualize the benefits of HVAC system 100, the layout of home 210 will first be described. This may show how control units 102 and the other devices of HVAC system 100 facilitate responsibilities in an example environment. Once the layout of home 210 is detailed, the configuration of control unit responsibility and setting replication will be discussed.

Home 210 comprises an attic 298, first zone 220, a second zone 250, and a basement 280. First zone 220 includes upstairs bathroom 230 and a bedroom 240. First zone 220 includes sensors 112a, 112b, and interactive display 114a. Second zone 250 includes a laundry room 260, a downstairs bathroom 265, and a living room 270. Second zone includes a sensor 112c, an interactive display 114b, and a access point 116 in living room 270.

In the illustrated embodiment, home 210 includes basement 280 comprising a first HVAC unit 104a and a second HVAC unit 104b. Basement 280 may also include a first control unit 102a and a second control unit 102b. First HVAC unit 104a may provide heating and/or cooling to first zone 220 through vents 296 while second HVAC unit 104b may provide heating and/or cooling to second zone 250 through vents 292.

First control unit 102a may be communicatively coupled to sensors 112a, 112b, and interactive display 114a using wired or wireless connections. First control unit 102a may communicate with HVAC unit 104a, to control the temperature of first zone 220. Second control unit 102b may be communicatively coupled to sensor 112c and interactive display 114b. Second control unit 102b may communicate with HVAC unit 104b to control the temperature of second zone 250.

Although the illustrated embodiment shows first control unit 102a and second control unit 102b both located in basement 280, this arrangement may not be possible for all homes. For example, home 210 may not have basement 280. Instead, first control unit 102a and second control unit 102b may be located in attic 298, in a closet, or outside home 210. As another example, in embodiments where first control unit 102a is wired to interactive display 114a, first control unit 102a may be located in attic 298 to be closer to sensors 112a, 112b, and interactive display 114a, while second control unit 102b is located in basement 280 to be closer to sensors 112c and interactive display 114b.

In some embodiments, home 210 may only have one control unit 102a. If the homeowner decides to add another HVAC unit 104b, the homeowner will have flexibility in where the associated control unit 102b may be placed. Thus, embodiments of the present disclosure not only allow for the creation of a distributed HVAC system but also for flexibility in the installation of HVAC units 104 and associated control units 102. As described in FIG. 5, in some embodiments when first control unit 102a is activated, it may search for an existing HVAC control network. If a pre-existing HVAC control network does not exist, first control unit 102a may create HVAC control network 124 as an ad hoc network and operate as a standalone access point. When second control unit 102b is activated, it may search for HVAC control network 124, discover the ad hoc HVAC control network 124 previously created by first control unit 102a, and join HVAC control network 124. Although in the illustrated embodiment HVAC control network 124 is a wireless network, HVAC control network 124 may be any network that facilitates communication between control units 102 and other devices of HVAC system 100.

Zone Management of a Distributed HVAC System

It may be advantageous for first control unit 102a and second control unit 102b to exchange information regarding the HVAC services each control unit 102 provides in HVAC system 100. By learning what services other control units 102 provide and where they provide those services within HVAC system 100, each control unit 102 may update its own devices, such as interactive displays 114, to allow a user to control HVAC services to any part of HVAC system 100.

In the illustrated embodiment first control unit 102a may use a Wi-Fi direct protocol to detect and connect with second control unit 102b to form HVAC control network 124. In some embodiments, first control unit 102a and second control unit 102b may first attempt to connect to any available local networks upon being activated. For example, if home 210 is equipped with LAN 126, first control device 102a and second control device 102b may first connect over the LAN 126.

Once connected, it may be advantageous for first control unit 102a and second control unit 102b to communicate the type of HVAC services that each control unit 102 provides, and what parts of HVAC system 100 receive those services. For example, first control unit 102a may communicate to second control unit 102b that first control unit 102a manages HVAC unit 104a and provides HVAC services to first zone 220. As explained below, this may be accomplished in different ways.

Upon connecting over HVAC control network 124 and/or LAN 126, control units 102 may exchange operational information regarding the HVAC units 104 and 106 that each control unit 102 manages. For instance, to convey the type of HVAC unit that second control unit 102b manages, second control unit 102b may communicate the serial number of HVAC unit 104b to first control unit 102a. Different types of HVAC units 104 may have identifiers within their serial number to identify the type of service the HVAC unit provides. Thus, in the illustrated embodiment, once first control unit 102a receives the serial number, first control unit 102a may then determine that HVAC unit 104b is a furnace. Control unit 102b may communicate other related information regarding HVAC unit 104b such as its maximum heat output (expressed in BTUs, Joules, or any other appropriate measurement). Similarly, depending on the type of HVAC unit 104, information such as airflow capacity and operational fan speeds may be communicated between control units 102. In some embodiments, control units may use a protocol comprising a list of all HVAC units 104, sensors 112, and interactive displays 114 connected to the control unit.

In some embodiments, second control unit 102b may communicate an installation report to first control unit 102a. The installation report details the type of HVAC units 104 connected to control unit 102b and the names of locations serviced by control unit 102b. Some or all of the installation report may be entered by a technician or customized by a homeowner. For example, a homeowner may enter the names of the rooms serviced by control unit 102b, or a technician may enter default names when setting up HVAC system 100. Furthermore, one or more rooms may be linked together to form a zone as shown in diagram 200. Thus, in the illustrated embodiment, a technician or homeowner may enter in interactive display 114b, that control unit 102b provides HVAC services for laundry room 260, bathroom 265, and living room 270. Furthermore, the technician or homeowner may group these rooms together as second zone 250.

After first control unit 102a determines the HVAC abilities of second control unit 102b, it may communicate the information to interactive display 114a. Once updated, interactive display 114a may show the rooms and/or zones covered by second control unit 102b in addition to the rooms and/or zones covered by first control unit 102a. Furthermore, first control unit 102a may also receive data from sensor 112c, and provide the ability to control the HVAC services provided by HVAC unit 104b.

For example, first control unit 102a may receive the temperature of living room 270 provided by sensor 112c. First control unit 102a may relay this temperature information to interactive display 114a. In this manner, a homeowner may view the temperature readings in any zone of home 210.

Second control unit 102b may also update interactive display 114b to reflect the presence of first HVAC unit 104a and first zone 220. In this manner, the separate and isolated HVAC systems may operate as a distributed HVAC system, allowing the homeowner to view and control first HVAC unit 104a and second HVAC unit 104b from a single device (e.g., interactive display 114a or user device 110).

After interactive display 114a is updated to include second zone 250, a homeowner may adjust the temperature of second zone 250 from interactive display 114a, even though interactive display 114a is associated with first zone 220. For example, first control unit 102a may receive temperature adjust commands from interactive display 114a that requests a temperature change for second zone 250. First control unit 102a may recognize that the command is for second control unit 102b, and communicate the temperature adjust command to second control unit 102b using HVAC control network 124 and/or LAN 126.

In some embodiments, first control unit 102a may associate second zone 250 with control unit 102b upon receiving the initial exchange of HVAC service information with control unit 102b. Any changes requested to second zone 250 may then be associated with second control unit 102b. In this manner, if HVAC system 100 has multiple control units 102, first control unit 102a may simply forward requests made through interactive display 114a to the proper control unit based on the associations made during the initial information exchange.

Once first control unit 102a forwards the temperature adjust commands to second control unit 102b, second control unit 102b may then communicate the command to second HVAC device 104b to adjust the temperature of second zone 250 according to the temperature adjust command.

In addition to communicating with interactive displays 114, embodiments of FIG. 2 may also allow a user to control HVAC system 100 from one or more user devices 110. For example, home 210 may have a LAN 126 generated by access point 116. Access point 116 may connect to network 120 using, for example, an Ethernet connection. As explained in FIG. 5, first control unit 102a and second control unit 102b may join LAN 126. Once connected to the LAN 126, first control unit 102a may discover user device 110.

User device 110 may run application 111 on a GUI presented by user device 110. If control unit 102a and user device 110 have never been connected, the homeowner may use application 111 to find and connect with control unit 102a. For example, application 111 may populate a list of available control units 102 that user device 110 may connect with. In some embodiments, it may be beneficial to conserve resources and only connect with and disseminate commands through control unit 102a. This may beneficially transfer the resource demands from user device 110 to first control unit 102a. If user device 110 and control units 102 have previously been connected, user device 110 may automatically connect with control units 102 upon detecting them on LAN 126.

Once first control unit 102a and user device 110 are connected, a homeowner may use user device 110 to control HVAC system 100. Application 111 may provide the homeowner with a number of commands to adjust the services provided by HVAC units 104a and 104b. For example, the homeowner may transmit a temperature adjust command over LAN 126 to first control unit 102a to change the temperature of living room 270, which is within second zone 250. First control unit 102a may receive the temperature adjust command from user device 110, recognize that the command is for living room 270, which is in second zone 250 controlled by second control unit 102b, and communicate the temperature adjust command to second control unit 102b over LAN 126. Second control unit 102b may then communicate the command to second HVAC device 104b to adjust the temperature of living room 270. Accordingly, a user may control the temperature in multiple rooms of home 210 despite being located in a zone that does not include the room where the temperature is adjusted.

In certain situations, second control unit 102b may disconnect from the LAN 126 and/or HVAC control network 124. For example, second control unit 102b may experience a malfunction with one or more of its interfaces that provide wireless communications. In some embodiments, second control unit 102b may disconnect while it receives a firmware upgrade causing a temporary interruption in communication. Once second control unit 102b disconnects from first control unit 102a, a user may lose the ability to control the entire HVAC system 100 from any location. Therefore it is necessary to efficiently inform the user when second control unit 102b disconnects from first control unit 102a.

First control unit 102a may lose communications with second control unit 102b if second control unit 102b disconnects from LAN 126 and/or HVAC control network 124. In response, first control unit 102a may update interactive display 114a to show that second control unit 102b is disconnected. In some embodiments, first control unit 102a may update first interactive display 114a with the communication networks that each control unit 102 is connected to. Thus, if second control unit 102b disconnects from one or both of HVAC control network 124 and LAN 126, first control unit 102a may update interactive display 114a with the specific network(s) that second control unit 102b has disconnected from. Interactive display 114a may then stop showing second zone 250.

First control unit 102a may also alert user device 110 that second control unit 102b is disconnected from the LAN 126 and/or HVAC control network 124. This may allow the homeowner to investigate why second control device 102b disconnected from the LAN 126. In some embodiments, second control unit 102b may be experiencing operational issues with its ability to communicate over HVAC control network 124 while maintaining its ability to communicate over LAN 126. In this situation, second control unit 102b may attempt to independently connect with user device 110 using LAN 126 or HVAC control network 102b.

In some embodiments, second control unit 102b may alert first control unit 102a that it is disconnecting from the LAN 126 and that first control unit 102a should instead communicate with second control unit 102b over HVAC control network 124. Additionally or alternatively, second control unit 102b may communicate an alert to first control unit 102a that second control unit 102b is completely disconnecting from both the LAN 126 and HVAC control network 124.

In some embodiments, user device 110 may be equipped to communicate with first control unit 102a and second control unit 102b over HVAC control network 124. For example, user device 110 may have the ability to use Wi-Fi direct. User device 110 may connect to first control unit 102a using Wi-Fi direct to join HVAC control network 124. Once joined to HVAC control network 124, user device 110 may communicate temperature control commands to first control unit 102a and/or second control unit 102b over HVAC control network 124.

In addition to updating interactive displays 114 with zone information, control units 102 may also provide interactive displays 114 with environmental data provided by sensors 112. For example, sensors 112a and 112b may connect to first control unit 102a over HVAC control network 124 using Wi-Fi direct. Sensor 112b may measure the ambient temperature of bedroom 240 and communicate the ambient temperature to first control unit 102a. First control unit 102a may also communicate the ambient temperature to interactive display 114a. First control unit 102a may also forward the ambient temperature information to second control unit 102b so that interactive display 114b may be updated with the ambient temperatures of first zone 220.

In some embodiments, first control unit 102a may also compare the ambient temperature received from sensors 112a and 112b to a temperature set point to determine whether bedroom 112b is within a preset temperature range. If the ambient temperature is outside the preset range, first control unit 102a may send a temperature command to first HVAC unit 104a to adjust the temperature in bedroom 240.

As another example, basement 280 may have sensor 112d (not pictured) that is a carbon monoxide detector. Sensor 112d may detect that the levels of carbon monoxide in basement 280 are at an unsafe level and communicate an alert to first control unit 102a. Control unit 102a may respond to the alert by shutting first HVAC unit 104a off, and sending an alert to user device 110 notifying the homeowner of the high levels of carbon monoxide.

Modifications, additions, or omissions may be made to diagram 200 without departing from the scope of the disclosure. For example, first control unit 102a may control more than one zone and may control more than one HVAC unit 104.

Timing Diagram of HVAC Communications

To further illustrate how first control unit 102a and second control unit 102b advantageously operate in HVAC system 100, FIGS. 3 and 4 provide example timing diagrams that show how control unit 102a and control unit 102b replicate settings upon connecting in HVAC system 100. FIGS. 3 and 4 also provide additional embodiments of the example protocols used between control units 102 when a user provides a command to interactive display 114a that is meant for control unit 102b. The following timing diagrams thus illustrate the technical benefits of expanded data viewing and equipment control when control units 102 cooperate in HVAC system 100.

FIG. 3 is an example timing diagram 300 showing how control units 102 may connect and replicate settings before updating zone control in HVAC system 100. Embodiments of timing diagram 300 provide a uniform HVAC system 100 amongst control units 102.

In the illustrated embodiment, timing diagram 300 comprises first control unit 102a, second (sibling) control unit 102b, first interactive display 114a, second interactive display 114b, and user 310. Although not shown in FIG. 3, first and second control units 102a and 102b may each be coupled to one or more HVAC units 104 and 106, sensors 112, and user devices 110 over one or more networks 124 and 126, as described and illustrated in FIGS. 1 and 2.

Timing diagram 300 starts at time 312, wherein first control unit 102a and second control unit 102b have yet to connect. Prior to discovering sibling control units 102, first control unit 102a may handle HVAC services for first zone 220 as indicated by zone notice 914. First control unit 102a may recognize devices in first zone 220 such as sensors 112a and 112b, as well as first interactive display 114a. First control unit 102a may update first interactive display 114a with zone notice 318. First interactive display 114 may show information regarding first zone 220, such as temperature readings from sensors 112a and 112b. First interactive display 114a may also allow user 310 to control HVAC settings for first zone 220.

Similarly, second control unit 102b may handle HVAC services for second zone 250 as indicated by zone notice 316. Second control unit 102b may recognize devices in second zone 250 such as sensor 112c and second interactive display 114b. Second control unit 102b may update second interactive display 114b with zone notice 320 so second interactive display 114b may show information regarding second zone 250. Information may include temperature readings from sensor 112c or HVAC settings for second zone 250.

Thus, first control unit 102a and second control unit 102b initially operate as siloed information systems. This is typically the extent that traditional HVAC systems operate. However, as explained below, first control unit 102a and second control unit 102b may operate to provide user 310 with expanded control over the entire HVAC system 100 from a single device.

At time 322, first control unit 102a discovers the presence of second control unit 102b in HVAC system 100. As explained in FIG. 5, control unit 102a may detect and connect with second control unit 102b over HVAC control network 124 using any appropriate communication protocol (e.g., Wi-Fi direct). Additionally or alternatively, first control unit 102a may initially connect with second control unit 102b over LAN 126 generated by access point 116.

Replicating Shared Settings

When first control unit 102a and second control unit 102b first connect, it may be beneficial for control units 102 to synchronize settings that are universal to HVAC system 100. Replicating settings amongst sibling control units 102 may provide a number of advantages not recognized in existing HVAC systems. For example, replicating universal settings may reduce the time it takes to install each individual control unit 102. A technician may activate each control unit 102, allowing each control unit 102 to begin recognizing other control units 102 in HVAC system 100. Once two or more control units 102 connect, they may begin replicating universal settings. This may prevent the technician from having to manually install settings at each control unit 102. Furthermore, if HVAC system 100 has multiple control units 102, a user may update settings on a single control unit 102 and the settings may update for the entire HVAC system. In large or geographically disperse systems, this may reduce the number of communication resources required to make system updates, and reduce the operational costs required when manually setting up HVAC systems.

As an illustrative example, control units 102 may operate using a plurality of local settings as well as a plurality of universal settings. Universal settings may be any setting that is common across HVAC system 100. As an example, and not by way of limitation, universal settings may include, a premise or facility address, occupancy settings for zones (is a room/zone occupied or unoccupied), the name and contact information for the dealer of HVAC units 104 and control units 102, air quality levels, dehumidification, a preferred temperature scale (e.g., ° C., ° F.), a preferred language, settings for HVAC control network 124 and LAN 126 (e.g., access point name and password), time zone, operating schedules, and a daylight saving time indicator among others. Local settings may include a control unit specific password, operating parameters for HVAC units 104 and 106, firmware operating revision, and any other setting that may be local to a single control unit 102.

To facilitate the intelligent replication of settings in HVAC system 100, control units 102 may each have an internal clock that allows each control unit 102 to time stamp when changes are made to HVAC system settings. This allows each control unit 102 to create a record of when a setting was changed, and in some embodiments, who changed the setting (e.g., technician, user, HVAC dealer). When first control unit 102a and second control unit 102b connect, they may first compare their respective internal clocks to ensure that they are operating on the same time. In certain embodiments, control units 102 may operate using a common timing protocol such as coordinated universal time (UTC).

If first control unit 102a and second control unit 102b have different internal clock times, first control unit 102a and second control unit 102b may synchronize their times. Control units 102 may synchronize clocks in a number of ways. For example, first control unit 102a may communicate with control server 118 and request a common clock time for each control unit 102 in the HVAC system. In some embodiments, first control unit 102a may simply update control unit 102b with its own control clock time.

After synchronizing clocks, first control unit 102a and second control unit 102b may replicate one or more settings by sending settings updates 322a and 322b. For example, first control unit 102a may receive a first setting update 322b from second control unit 102b over HVAC control network 124 and/or LAN 126. First control unit 102a may then determine whether the first setting update is a universal setting.

To determine whether the first setting is a universal setting, first control unit 102a may compare the first setting to a list of predetermined universal settings. For instance, first control unit 102a may search its memory to determine if first setting is stored as a universal setting. As another example, control unit 102a may compare the first setting to a list of pre-approved universal settings. In some embodiments the list of approved settings may be set by the manufacturer of control unit 102a. In some embodiments, a user may be able to add and remove settings to the universal settings list.

If first setting is a universal setting, first control unit 102a may next determine whether the first setting received from second control unit 102b takes priority over the stored universal setting. This may be accomplished by comparing the time stamps of the received first setting compared to the stored universal setting. In some embodiments, certain users may have higher privileges in HVAC system 100. Changes made to settings by privileged users may take priority over setting updates from users without the same or higher privileges.

If the received first setting time has a newer time stamp (i.e., was updated more recently) than the stored setting time, first control unit 102a may update the universal settings database with the received first setting update. If the stored universal setting has a more recent time stamp, first control unit 102a may maintain the existing setting. Furthermore, first control unit 102a may recognize that second control unit 102b is operating using an older setting and communicate the stored universal setting to second control unit 102b.

As an illustration, first control unit 102a may have a stored universal setting for a preferred temperature scale. On Jan. 1, 2015, at 10:03 a.m. CST, user may choose to set the temperature scale to Fahrenheit. First control unit 102a may time stamp this change in any appropriate manner to indicate the time the update was made. The user may later add second control unit 102b to the HVAC system already running first control unit 102a. The user may set second control unit 102b to the Celsius temperature scale on Jan. 15, 2015, at 9:15 a.m. CST. Second control unit 102b may connect with first control unit 102a, confirm that their respective clocks are the same, and begin sharing universal settings.

Second control unit 102b may transfer the preferred temperature scale (Celsius) to first control unit 102a. First control unit 102a may determine that temperature scale is a universal setting and then determine that the temperature preference for control unit 102b was updated more recently than the temperature preference already stored in memory. First control unit 102a may then update its temperature scale preference to Celsius to reflect the most recent preferences of the user. Although described as updating a universal temperature setting, control units 102 may replicate changes made to other universal settings in a similar manner.

In some embodiments, first control unit 102a may recognize that the first setting update sent by second control unit 102b is a factory setting. First control unit 102a may then transmit the universal settings stored in memory to update the factory settings of second control unit 102b. In certain embodiments, control units 102 may have separate databases for local settings and universal settings. In some embodiments, control unit 102a may allocate separate portions of memory specifically for local settings and universal settings.

In some embodiments, control server 118 may be used to communicate updated settings to first control unit 102a and second control unit 102b. For example, first control unit 102a may connect to control server 118 over network 120 using access point 116. Control server 118 may transmit an updated universal setting to first control unit 102a. In some embodiments, the updated universal setting may be part of a HVAC system 100 update, wherein multiple changes may be made to the settings of control units 102. In certain embodiments, the updated universal setting may be sent from an HVAC dealer from remote device 122. First control unit 102a may receive the updated setting and determine that it is a universal setting. First control unit 102a may update its own universal settings database with the updated setting and then transmit the universal setting to second control unit 102b using HVAC control network 124 and/or LAN 126.

A user may change a universal setting for first control unit 102a using interactive display 114a. First control unit 102a may receive the updated setting, determine that it is a universal setting, store the updated setting in memory, and transmit the updated universal setting to control unit 102b. In some embodiments, the user may change a local setting with first interactive display 114a, such as a password to access control unit 102a. Control unit 102a may receive the updated local setting, determine that the local setting is not a universal setting, and store the local setting in memory without transmitting the local setting update to control unit 102b. In this manner, control units 102 may limit setting replication to settings that are universal to HVAC system 100.

After control units 102 replicate settings, they may begin updating other system devices and applications regarding the discovered control unit 102. First control unit 102a may send sibling update command 324 to first interactive display 114a. First interactive display 114a may update the zones that are displayed on its screen using sibling notice 328. First interactive display 114a may display second zone 250, and each room that is within second zone 250. First interactive display 114a may also update the display with any additional information about second zone 250, such as the presence of sensors 112c, sensor 112c readings, and HVAC unit 104b. In a similar manner, control unit 102b may send sibling update command 326 to second interactive display 114b to update the zones and information displayed by second interactive display 114b.

After interactive displays 114 update their respective screens to include the presence of zones 220 and 250, user 310 may use interactive display 114a to send command 332 to change a setting of second zone 250. For example, interactive display 114a may display a list of zones available for a user to interact with. For instance, interactive display 114a may display first zone 220 and second zone 250 on its screen. In some embodiments, interactive display 114a may also show each room in the zone along with a list of commands that are available for that froom. For example, command 322 may be a temperature setting command, a set point for a specific room, a change to a universal or local setting, or any other appropriate command.

Interactive display 114a may communicate published zone setting 334 to control unit 102a, indicating the settings changed by user 310. Control unit 102a may recognize that second zone 250 is handled by control unit 102b and forward published zone setting 334 to control unit 102b.

Control unit 102b may receive command 336 from control unit 102a indicating user 310 requested a settings change for second zone 250. Control unit 102b may send the appropriate command to HVAC unit 104b to implement the settings request made by user 310. Control unit 102b may then send out publish status command 338 to control unit 102a and publish zone status command 340 to second interactive display 114b. Interactive display 114b may receive publish zone status command 340 and update its display with zone notice 342. Control unit 102a may receive published status command 338 from control unit 102b and forward it to first interactive display 114a as published status command 344. First interactive display 114a may update its screen with update notice 346 for second zone 250. For example, user 310 may have requested a new temperature set point for second zone 250. Update notice 346 may indicate the new temperature set point for second zone 250 as requested by user 310.

Using embodiments of FIG. 3, control units 102 may provide user 310 with enhanced control over the HVAC system with little setup or involvement by user 310. By identifying the control unit 102 that is operable to control a zone setting, the functionality of FIG. 3 may be expanded to multiple control units 102c-n operating additional interactive displays 114c-n, and HVAC units 104c-n. For example, although timing diagram 300 shows interactive display 114a receiving a command for control unit 102b, user 310 may additionally or alternatively use interactive display 114b to send a command to control unit 102a. In this manner, interactive display 114b physically located in second zone 250 may be used to adjust settings and temperatures of first zone 220.

Timing Diagram for Control Unit Disconnection

First control unit 102a and second control unit 102b may operate unimpeded for a length of time. Should control units 102 experience a break in communication, control units 102 may update HVAC system 100 to show the reduction in operational ability. FIG. 4 is an example timing diagram 400 showing how control units 102 update zone control after losing communication. In the illustrated embodiment, timing diagram 400 starts with first control unit 102a and second control unit 102b already discovered. Thus, FIG. 4 builds on the timing diagram described in FIG. 3.

At time 410, second control unit 102b disconnects from control unit 102a. Second control unit 102b may disconnect from first control unit 102a for a number of reasons. These events may cause second control unit 102b to disconnect from HVAC control network 124 and/or LAN 126. As described in FIG. 2, second control unit 102b may take additional steps to alleviate issues arising from a sudden disconnection, such as alerting first control unit 102a prior to disconnecting.

Once first control unit 102a detects that second control unit 102b is disconnected, first control unit 102a may send off-line command 412 to first interactive display 114a. First interactive display 114a may use update notice 416 to remove second zone 250 from its screen. Similarly, second control unit 102b may send off-line command 414 to second interactive display 114b. Second interactive display 114b may use update notice 418 to remove first zone 220 from the screen of second interactive display 114b.

Accordingly, control units 102 may provide user 310 with updated control over the HVAC system when communication interruptions affect the ability of user 310 to control different zones of the HVAC system. In some embodiments, it may be advantageous for first control unit 102a to alert user device 110 upon disconnecting from second control unit 102b. For example, if second control unit 102b fails to reconnect within a certain period of time (e.g., 10 minutes), first control unit 102a may determine that second control unit 102b is malfunctioning, and may send an alert message to user device 110. This functionality may help create a robust and resilient HVAC system 100 that responds quickly to deviations in operational performance.

Establishing and Configuring Concurrent HVAC Networks

While the foregoing figures have focused on the replication of settings between control units 102, and how control units 102 work to create robust control over each area of HVAC system 100, FIGS. 5 and 6 focus on the one or more networks that control units 102 may create and utilize to provide a resilient, reliable, and secure HVAC system 100.

FIG. 5 is an example diagram illustrating HVAC system 100 having multiple communication networks. Embodiments of FIG. 5 provide a number of technical solutions when configuring a distributed HVAC system comprising a first control unit 102a, second control unit 102b, first user device 110a, and second user device 110b. Certain embodiments also provide for a resilient HVAC control network when a distributed HVAC system is operating over multiple networks. Other embodiments of FIG. 5 provide unique troubleshooting solutions when diagnosing and remediating issues in a distributed HVAC network using remote device 122 and mobile device 526.

In the illustrated embodiment, control units 102 may be setup using a "one-step" configuration process to create a distributed HVAC system 100. First control unit 102a may be communicatively coupled to first HVAC unit 104a and first interactive display 114a.

When first control unit 102a is activated, it may search for an existing HVAC control network. If first control unit 102a determines that there is not an existing HVAC control network, first control unit 102a may create HVAC control network 124 as an ad hoc network and operate as a stand-alone access point. First control unit 102a may then be designated as the Group Owner (GO) of HVAC control network 124. In certain embodiments, once first control unit 102a is designated as GO, first control unit 102a will retain the designation of GO in future P2P connections. In some embodiments, first control unit 102a may be designated as the registrar in HVAC control network 124, and may have the ability to issue and revoke credentials to devices attempting to connect to HVAC control network 124. Furthermore, control unit 102a may act as a persistent GO to continuously scan for additional devices on HVAC system 100.

Second control unit 102b may be communicatively coupled to a second HVAC unit 104b and second interactive display 114b. When second control unit 102b is activated, it may search for HVAC control network 124, discover the HVAC control network 124 previously created by first control unit 102a, and connect to HVAC control network 124. Second control unit 102b may be designated as a peer-to-peer (P2P) client of first control unit 102a in HVAC control network 124. Furthermore, first control unit 102a and second control network 102b may utilize one or more protocols to enhance the security of HVAC control network. For instance, first control unit 102a and second control unit 102b may utilize Wi-Fi Protected Setup (WPS) to ensure secure communications over HVAC control network 124.

In certain embodiments, second control unit 102b discovers and joins HVAC control network 124 using a Wi-Fi direct, push button configuration. For example, second control unit 102b may comprise a push button that initiates the Wi-Fi direct protocol. When a user activates second control unit 102b and presses the push button, second control unit may scan for and join the previously established HVAC control network 124.

In some embodiments, second interactive display 114b comprises a virtual push button icon. Second control unit 102b may discover and join HVAC control network 124 using a Wi-Fi direct, push button configuration protocol in response to detecting that a user selected the virtual push button icon. This may allow an installer to setup second control unit 102b and then scan for HVAC control network 124 from a more convenient location (i.e., wherever second interactive display 114b is located).

Once second control unit 102b enters push button configuration operations, it may scan for HVAC control network 124 for a predetermined amount of time. For instance, second control unit 102b may scan for a default period (e.g., 15 seconds), or a technician/homeowner may change a setting in control unit 102b to scan for a longer period. The scan period may either be a local setting or a universal setting.

Instead of using a push button, first interactive display 114a may prompt a user to input a PIN associated with second control unit 102b. For example, first control unit 102a may detect, as GO, that second control unit 102b is within range of HVAC control network 124. First control unit 102a may instruct interactive display 114a to display a prompt for a user to input a PIN. The PIN may be a number associated with second control unit 102b. In some embodiments, the PIN may be written on second control unit 102b. Once the user inputs the PIN to first interactive display 114a, second control device 102b may connect to HVAC control network 124 and first control unit 102a.

In certain embodiments, first control unit 102a and second control unit 102b may utilize near field communication (NFC) to transfer PIN data. This may alleviate the need for a user to enter the PIN information into first interactive display 114a.

In some embodiments, once a device connects to HVAC control network 124, first control unit 102a and/or second control unit 102b may store the device's network address in memory. This may allow efficient onboarding to HVAC control network 124 during future connection attempts should a device become disconnected from HVAC control network 124.

Although described as using a Wi-Fi direct protocol using Wi-Fi protected setup, HVAC control network may use any appropriate protocol that allows devices to network together and facilitate information. For example, first control unit 102a and second control unit 102b may use a universal plug and play (UPnP) protocol or zero-configuration networking (zeroconf).

In some embodiments, control units 102 may have previously been connected over HVAC control network 124 and have information regarding HVAC control network 124 stored in memory. For example, third control unit 102c may be a legacy control unit that was once connected to HVAC control network 124. When third control unit 102c is reactivated, it may already have stored parameters associated with how to connect with HVAC control network 124, such as the SSID and PIN of HVAC control network 124. Thus, third control unit 102c may connect to HVAC control network 124 without going through the Wi-Fi direct, push-button configuration for a second time. In certain embodiments, first control unit 102a may recognize third control unit 102c as a legacy unit and send an invitation (request) to join HVAC control network 124.

Once connected using HVAC control network 124, first control unit 102a may designate to second control unit 102b that HVAC control network 124 be the primary communications network for these devices. In some embodiments, the preferred or primary communications network may be a local setting or a universal setting. In certain embodiments, a user may select the primary communications network. Furthermore, as described in FIGS. 2-4, once first control unit 102a and second control unit 102b join over HVAC control network 124, control units 102 may replicate universal settings and exchange information regarding the HVAC units 104 and 106 that each control unit manage. First control unit 102a may update first interactive display 114a to reflect the discovered information allowing a user to control the operation of second HVAC unit 104b from first interactive display 114a.

In addition to creating and connecting over HVAC control network 124, first control unit 102a and second control unit 102b may also search for other networks to facilitate communications over. For example, access point 116 may generate LAN 126. Access point 116 may include a router and an Ethernet switch to enable devices connected to LAN 126 to connect to network 120. LAN 126 may already exist when first control unit 102a is activated or it may be generated after first control unit 102a is activated.

First control unit 102a and second control unit 102b may detect and connect to LAN 126. For example, LAN 126 may be a WLAN using an IEEE 802.11 Wi-Fi protocol (e.g., 802.11b/g/n). However, in some embodiments, LAN 126 may facilitate communications other than an 802.11 protocol, such as ZigBee or Bluetooth, among others.

Once joined to LAN 126, first control unit 102a may re-designate HVAC control network 124 as the secondary communications network and designate LAN 126 as the primary communications network for these devices. In this manner, first control unit 102a and second control unit 102b may be connected to, and operate concurrently, over both HVAC control network 124 and LAN 126.

In some embodiments, to operate concurrently over both HVAC control network 124 and LAN 126 control units 102 may communicate over HVAC control network 124 using a first media access control (MAC) address associated with an independent basic service set (IBSS) and communicate over LAN 126 using a second MAC address associated with a basic service set (BSS). In this manner, a Wi-Fi network (e.g., LAN 126) may use a different MAC address than a Wi-Fi direct network (e.g., HVAC control network 124). In some embodiments, first control unit 102a and second control unit 102b may communicate concurrently over HVAC control network 124 and LAN 126 using different frequencies or time-sharing the communication channel. In certain embodiments, the MAC address associated with LAN 126 may operate on a first channel and the MAC address associated with HVAC control network 124 may operate on a second channel.

Operating concurrently over multiple networks may provide several technical advantages. For example, first control unit 102a may reduce congestion over LAN 126 by performing certain communications over a first channel frequency used by LAN 126, and performing other communications using a second channel frequency used by HVAC control network 124. In this way, first control unit 102a may carry out high bandwidth communications over the communications pathway that is the least congested. Concurrent network communication may also be advantageous if second control unit 102b has issues connecting with LAN 126 but not HVAC control network 124.

For example, first control unit 102a may detect and connect to first user device 110a and second user device 110b, which may be connected to LAN 126. First control unit 102a may receive a temperature control command from first user device 110a using application 111 over LAN 126. The temperature control command may be for a zone not controlled by HVAC unit 104a. To reduce the number of communications sent over LAN 126, first control unit 102a may transmit the temperature control command to second control unit 102b over HVAC control network 124. Second control unit 102b may then communicate the temperature command to second HVAC unit 104b. If congestion is not an issue, or if control units 102 are not experiencing connection issues with LAN 126, first control unit 102a and second control unit 102b may also communicate using LAN 126 (i.e., first control unit 102a may transmit the temperature control command to second control unit 102b over LAN 126).

In addition to connecting with user devices 110 over LAN 126, it may also be advantageous for control units 102 to connect to control server 118. If access point 116 provides access to network 120, control units 102 may connect to control server 118 over network 120. Depending on the environment of HVAC system 100, control server 118 may connect to control units 102 over the Internet. In some embodiments, HVAC system 100 may be a self-contained system, and control server 118 connects with control units 102 over a local intranet. As explained in greater detail in FIGS. 7 and 8, first control unit 102a may connect to control server 118 for a number of reasons. For instance, first control unit 102a may register with control server 118 and receive firmware upgrades.

Operation of a Resilient HVAC System

Operating control units 102 concurrently over multiple communication networks provides a number of technical benefits for HVAC system 100. As explained below, technical advantages of HVAC system 100 include increased reliability and resiliency of control unit 102 operation. Embodiments of FIG. 5 provide for uninterrupted HVAC services in light of network failures and communication interruptions. Automatic handover of HVAC services to one or more concurrent networks allows technicians to diagnose issues with failing networks while maintaining HVAC services for HVAC system 100.

To enable control units 102 to operate a resilient HVAC system 100, control units 102 may maintain a control unit directory. A control unit directory may allow each control unit 102 to have up-to-date knowledge of sibling control units in HVAC system 100 including the network configuration details on how to communicate with sibling control units over HVAC control network 124 and LAN 126. Furthermore, control units 102 may store the configuration data needed to connect to HVAC control network 124 and LAN 126.

As an example, upon connecting to LAN 126, first control unit 102a may store the LAN SSID, password, and LAN status. Upon connecting to HVAC control network 124, first control unit 102a may store the HVAC control network status, a group ID, and a list of group members (i.e., control units 102 connected over HVAC control network 124). Additionally, for each control unit 102 that first control unit 102a is connected to, control unit 102a may store a MAC address, an IP address, and a globally unique identifier (GUID) for each respective control unit 102. As explained above, in some embodiments control unit 102a may store a MAC address for communication over HVAC control network 124 and a separate MAC address for communication over LAN 126.

In some embodiments, to ensure that first control unit 102*a* has the proper network configuration data for second control unit 102*b*, first control unit 102*a* may time stamp the configuration data and refresh the configuration data periodically. For example, first control unit 102*a* may refresh the configuration data at set intervals (e.g., every fifteen minutes), and/or refresh the configuration data upon determining that the data is stale (e.g., the time stamp for the configuration data, either individual time stamp or collective time stamp, is more than fifteen minutes old).

First control unit 102*a* may use any appropriate protocol to transmit and receive network configuration updates. For example, first control unit 102*a* may update the network configuration information of second control unit 102*b* by sending a zero configuration networking (ZCN) query to second control unit 102*b*.

In certain embodiments, specific types of configuration data may be designated as persistent data. For example, the MAC address of sibling control units 102 may be marked as persistent, indicating that first control unit 102*a* should not modify a previously stored value for the MAC address assigned to a particular communications network. As another example, the GUID for a particular control unit 102 may be marked as persistent.

To ensure that control units 102 operate resiliently in HVAC system 100 first control unit 102*a* may take steps to inform and connect to each control unit 102 over each available communication network. For example, first control unit 102*a* may be connected second control unit 102*b* only using HVAC control network 124, while first control unit 102*a* may be connected to third control unit 102*c* only using LAN 126. To reinforce the resiliency of HVAC system 100, first control unit 102*a* may refresh the LAN network configuration details stored in memory and communicate the LAN network configuration details to second control unit 102*b*. Second control unit 102*b* may then connect to LAN 126 and connect with first control unit 102*a*.

Similarly, first control unit 102*a* may attempt to connect to third control unit 102*c* over HVAC control network 124, in addition to connecting to third control unit 102*c* over LAN 126. First control unit 102*a* may send third control unit 102*c* a request to connect over HVAC control network 124. For example, first control unit 102*a* may request that third control unit 102*c* connect to HVAC control network 124 using WPS, such as a push-button configuration. In some embodiments, third control unit 102*c* may send an prompt to third interactive display 114*c* to allow a user to select a virtual push button to enable third control unit 102*c* to connect with first control unit 102*a* over HVAC control network 124. In this manner, first control unit 102*a* may reinforce the resiliency of HVAC system 100 by ensuring that each control unit 102 is operable to communicate over HVAC control network 124 and LAN 126. While operating concurrently over LAN 126 and HVAC control network 124, first control unit 102*a* and/or second control unit 102*b* may experience a communication error with LAN 126. For example, access point 116 may suffer an operational failure resulting in the loss of LAN 126. As another example, a homeowner may change the password to access LAN 126 without updating control units 102*a* and 102*b*. This may lead to a failed authentication between control units 102 and LAN 126. In some embodiments, first control unit 102*a* may detect that a communication signal (e.g., Wi-Fi strength), for LAN 126 is intermittent or weak and is causing communication errors in LAN 126. To maintain the distributed HVAC system 100, upon detecting a communications failure or a weak signal in LAN 126, control units 102 may automatically handoff communications to HVAC control network 124. This may be accomplished by having first control unit 102*a* and second control unit 102*b* assume the P2P rolls created when HVAC control network 124 was originally established. For instance, first control unit 102*a* may retain its role as Group Owner (GO) and second control unit 102*b* may retain its role as the P2P client. Furthermore, first control unit 102*a* may communicate with user devices 110 over HVAC control network 124, instead of using LAN 126.

In some embodiments, upon detecting the unavailability of LAN 126, first control unit 102*a* may notify second control unit 102*b* of the LAN failure and designate HVAC control network 124 as the primary communications network. Subsequent communications among devices in HVAC system 100 are then performed over HVAC control network 124. For example, once first control unit and second control unit 102 have re-designated HVAC control network 124 as the primary communications network, first control unit 102*a* may receive a command from first user device 110*a*, recognize that second HVAC unit 104*b* controls the zone affected by the command, and communicate the command to second control unit 102*b* over HVAC control network 124. Accordingly, control units 102 are able to provide uninterrupted HVAC service despite a communication failure in LAN 126.

In addition to communicating with second control unit 102*b* and user devices 110 over concurrent communication networks, first control unit 102*a* may communicate with other HVAC devices such as first interactive display 114*a* and sensors 112 over LAN 126 and HVAC control network 124. As an example, first control unit may detect and communicate with interactive display 114*a* over LAN 126. A user may transmit a temperature command using interactive display 114*a* over LAN 126. First control unit 102*a* may receive the temperature change command and determine that the temperature change command is for HVAC unit 104*a* and communicate the temperature command to HVAC unit 104*a* using and RSBus protocol. In some embodiments, the temperature command may be for a zone first control unit 102*a* associates with second control unit 102*b*. First control unit 102*a* may then communicate the temperature change command to second control unit 102*b* using LAN 126.

First control unit 102*a* may then detect a communication failure in LAN 126 and connect with interactive display 114*a* over HVAC control network 124. In this manner, a user may still communicate commands to first control unit 102*a* over HVAC control network 124, despite the failure of LAN 126.

As an example embodiment, first control unit 102*a* and second control unit 102*b* may operate concurrently over HVAC control network 124 and LAN 126. In some embodiments, LAN 126 may operate as a Wi-Fi network and HVAC control network 124 may facilitate communication using Wi-Fi direct. First control unit 102*a* may detect and connect to user device 110 over LAN 126. User device 110 may access control unit 102*a* using application 111 and send a command (e.g., a temperature control command, a set point, a change to a setting) to first control unit 102*a* of LAN 126. In some embodiments, first control unit 102*a* may detect that the first command is for second control unit 102*b*, and first control unit 102*a* may communicate the command to second control unit 102*b* over LAN 126. In some embodiments, first control unit 102*a* may determine that the command is for first HVAC unit 104a, and first control unit 102a may communicate the command to first HVAC unit 104a.

First control unit may then detect a communication failure in LAN 126 and communicate with user device 110 and second control unit 102b over HVAC control network 124 using Wi-Fi direct. Thus, without experiencing an interruption in HVAC service or communication, user device 110 may communicate a second command to first control unit 102a over HVAC control network 124. First control unit 102a may determine that the command is for second control unit 102b and communicate the command to second control unit 102b using HVAC network 124. In some embodiments, the first control unit 102a may determine that the second command is for first HVAC unit 104a and communicate the second command to first HVAC unit 104a.

In some embodiments, it may be advantageous for first control unit 102a to notify second control unit 102b using HVAC control network 124 of failures in LAN 126. For instance, second control unit 102b may be setup to try and reconnect to LAN 126 periodically unless notified by first control unit 102a that LAN 126 is experiencing operational failures.

As another example, first control unit 102a may initially communicate with first interactive display 114 and second control device 102b over LAN 126. First control device may detect that LAN 126 has a weak or intermittent signal and switch communications with first interactive display 114 and second control unit 102b to the HVAC control network 124.

Although the resiliency of HVAC system 100 is described using user devices 110 and interactive displays 114, any other device in HVAC system 100 may utilize the resilient nature of system 100. For instance, sensors 112 may connect to control units 102 concurrently over HVAC control network 124 and LAN 126.

Accordingly, despite not being able to communicate over LAN 126, first control unit 102a may maintain communications with user devices 110 and second control unit 102b over HVAC control network 124.

Diagnosing Issues in an HVAC System

Embodiments of FIG. 5 also illustrate a number of technical advantages associated with the troubleshooting of a distributed HVAC system 100. When HVAC units 104 or control units 102 experience operational issues, a technician or HVAC dealer may troubleshoot the issues and diagnose the problem. Embodiments of HVAC system 100 provide a number of secure and efficient solutions for troubleshooting a distributed HVAC system 100 operating over multiple networks both locally and remotely.

Over its lifetime, first HVAC unit 104a may breakdown or experience other operational failures. When an operational failure occurs, a technician may be called to repair first HVAC unit 104a. Prior to sending a technician to diagnose an HVAC issue in person, it may be beneficial for an HVAC dealer or repair company to diagnose HVAC system 100 remotely to preemptively determine what the issues are. A technician may use remote troubleshooting device 122 to communicate with control units 102 to try and determine what devices in HVAC system 100 need to be diagnosed. In this manner HVAC system 100 may provide a number of solutions to alleviate the problems associated with troubleshooting HVAC units 104 in person.

In an example embodiment, first control unit 102a may communicate with second control unit 102b and user devices 110 concurrently over both HVAC control network 124 and LAN 126. First control unit 102a may connect to control server 118 over network 120 using access point 116. As explained below in FIGS. 9 and 10, control server 118 may facilitate communications between remote troubleshooting device 122 and control units 102 by allowing remote troubleshooting device 122 to access operational parameters associated with control units 102 and HVAC units 104 (e.g. settings, airflow capacity, motor speeds, heat output, and error flags). In some embodiments, operational parameters of HVAC units 104 are stored on a control server database. Additionally or alternatively, control units 102 may transmit operational parameters for HVAC units 104 to remote troubleshooting device 122 and control server 118 in response to receiving a request for the parameters.

In some embodiments, remote troubleshooting device 122 may communicate with first control unit 102a over a control connection established between control server 118 and control unit 102a. In some embodiments, first control unit 102a may alert control server 118 that a device in HVAC system 100 is experiencing a malfunction. Control server 118 may notify the HVAC dealer or an approved technician to remotely diagnose HVAC system 100 by communicating with control unit 102a over network 120. If remote troubleshooting device 122 communicates with first control unit 102a to diagnose an operational issue, control unit 102a may transmit a notification message to user devices 110 notifying user devices 110 that an issue with the HVAC system is being diagnosed remotely by remote troubleshooting device 122. In some embodiments, control units 102 may communicate with interactive displays 114 to show a message indicating that the HVAC system is being diagnosed by remote troubleshooting device 122 and/or mobile troubleshooting device 526.

To better diagnose an operational failure in HVAC system 100, it may be beneficial for a technician to access the operational parameters of first HVAC unit 104a from first control unit 102a in person. This may allow the technician to examine HVAC system 100 while accessing the operational parameters of first HVAC unit 104a. However, for security reasons, an owner of first HVAC unit 104a may not want to grant the technician access to LAN 126. Instead, the technician may use mobile troubleshooting device 526 to connect to first control unit 102a over HVAC network 124.

As an illustration, a technician may visit HVAC system 100 in person to troubleshoot first HVAC unit 104a. The technician may use remote troubleshooting device 526 to communicate with first control unit 102a and second control unit 102b over HVAC control network 124 using Wi-Fi direct. Local user device 110a (e.g., a homeowner) may stay connected to first and second control units 102 over LAN 126. This functionality allows mobile troubleshooting device 526 to communicate with first control unit 102a without accessing LAN 126 and detecting or accessing user devices 110.

Control units 102 may also provide additional transparency to users when remote troubleshooting device 122 and/or mobile troubleshooting device 526 are diagnosing issues with HVAC system 100. For example, first control unit 102a may notify local user device 110a when first control unit 102a is communicating with mobile troubleshooting device 526 or remote troubleshooting device 122. This notification may also indicate to local user device 110a that the user will not be able to control HVAC units 104 while mobile troubleshooting device 526 or remote troubleshooting device 122 is diagnosing HVAC units 104.

In certain embodiments, HVAC system 100 may be providing critical HVAC services. For example, HVAC system 100 may be providing services to a hospital or an industrial plant. A user or HVAC dealer may program first control unit 102a to transmit a permission request to user devices 110 before allowing mobile troubleshooting device 526 or remote troubleshooting device 122 to access first control unit 102a and adjust settings or controls associated with HVAC system 100.

HVAC system 100 may also solve a number of issues when users are unable to coordinate a time for a technician to diagnose issues in HVAC system 100. It may be inconvenient for a user to be home when a technician diagnoses HVAC unit 104a using mobile troubleshooting device 526. For instance, a user may be at work or running errands when a technician arrives to troubleshoot HVAC unit 104a. To overcome this issue, first control unit 102a may communicate with remote user device 110b through control server 118 over network 120. This may allow first control device 102a to send notifications, alerts, and permission requests to remote user device 110b, even when remote user device 110b is not connected to LAN 126 or HVAC control network 124.

Troubleshooting HVAC system 100 may present unique challenges if HVAC system 100 lacks a connection to network 120. For instance, access point 116 may experience an operational failure and access to network 120 may be disconnected, or HVAC system 100 simply may not have access to network 120. Embodiments of the present disclosure allow remote troubleshooting device 122 to access first control unit 102a despite not having a connection to first control unit 102a through network 120. Furthermore, embodiments of the present disclosure allow mobile troubleshooting device 526 to communicate with control server 118 while also communicating with first control unit 102a despite not having a connection to control server 118 through access point 116.

To provide additional support to a technician connected to first control unit 102a over HVAC control network 124 using mobile troubleshooting device 526, remote troubleshooting device 122 may use mobile troubleshooting device 526 as a bridge to access first control unit 102a using HVAC control network 124. Thus, remote troubleshooting device 122 and control server 118 may use mobile troubleshooting device 526 to communicate with first control unit 102a when HVAC system 100 lacks a connection to network 120. Using mobile troubleshooting device 526 as a bridge may be beneficial if remote troubleshooting device 122 has tools available to diagnose HVAC units 104 that mobile troubleshooting device 526 lacks. Mobile troubleshooting device 526 may also access information stored on control server 118 despite first control unit 102a not being able to access control server 118 itself using access point 116.

In certain embodiments, mobile troubleshooting device 526 may communicate with first control unit 102a over HVAC control network 124 and access control server 118 and/or remote troubleshooting device 122 over network 120 using a mobile telecommunications technology such as a 2G, 3G, or LTE network. Although HVAC system 100 may not provide a means for control units 102 to access network 120, in certain embodiments, first control unit 102a may have a USB port that can receive a USB Ethernet dongle allowing first control unit 102a to connect to network 120 without using access point 116. This may provide a self-sufficient means for control units 102 to communicate with remote troubleshooting device 122, while still communicating with devices in HVAC system 100.

For example, first control unit 102a may communicate with remote troubleshooting device 122 over network 120 using a USB Ethernet dongle. First control unit 102a may also communicate with second control unit 102b over HVAC control network 124. If an operational issue occurs with second HVAC unit 104b, and first control unit 102a is the only control unit 102 with a USB Ethernet dongle, remote troubleshooting device 122 is still able to diagnose second control unit 102b over network 120 using HVAC network 124 through first control unit 102a.

Accordingly, HVAC system 100 may provide a number of troubleshooting techniques and options for diagnosing issues with control units 102, HVAC units 104, and any other device that is part of HVAC system 100. Furthermore, by operating concurrently over multiple communication networks, HVAC system 100 may provide secure and efficient solutions for users and technicians when diagnosing issues in system 100.

Distributed HVAC System Across Multiple Access Points

HVAC system 100 may be geographically dispersed and not suitable for a single access point 116. This issue may arise, in warehouses, office buildings, apartments, schools, and large homes. To overcome this issue, multiple access points 116b, 116c may communicate with central access point 116a to provide a cohesive communication network for HVAC system 100. FIG. 6 is an example networking system 600 depicting the communication between control units 102 and multiple access points 116a-c.

In the illustrated embodiment, networking system 600 comprises a first control unit 102a communicatively coupled to first interactive display 114a. First control unit 102a may connect to LAN 126a created by first access point 116b. Second control unit 102b is communicatively coupled to second interactive display 114b and may also connect to LAN 126a. Third control unit 102c is communicatively coupled to third interactive display 114c and may connect to LAN 126b using second access point 116c.

Access points 116b and 116c may provide overlapping coverage areas to prevent any communication dead zones in HVAC system 100. Access points 116b and 116c may then communicate with central access point 116a. Central access point 116a may be a hardware access point or a software access point running on a computer equipped with a wireless network interface. Furthermore, access points 116b and 116c may be wired to central access point 116a to create a wired Ethernet network or they may communicate with central access point 116a using a wireless connection, such as an IEEE 802.11 protocol. Any suitable connection may link central access point 116a with access points 116b and 116c.

As described above in FIG. 2, once control units 102a-c connect to their respective access point 116b, 116c, each control unit 102a-c may identify and connect to the other control units 102a-c in HVAC system 100 that are part of networking system 600.

For example, first control unit 102a and second control unit 102b may already detect and connect to each other over wireless network 126a created by access point 116b. Additionally or alternatively, first control unit 102a and second control unit 102b may detect and connect to each other over HVAC control network 124, for instance, by using Wi-Fi direct. Once access point 116b communicates with central access point 116a, first control unit 102a and second control unit 102b may detect and connect to third control unit 102c.

Depending on the physical proximity of control units 102a-c it may only be possible to establish HVAC control network 124 between first control unit 102a and second control unit 102b. However, because control units 102 are connected through access point 116a, control unit 102a may update first interactive display 114a to show second control unit 102b and third control unit 102c.

In certain embodiments, third control unit 102c may wish to update a temperature setting in a zone controlled by second HVAC unit 102b. Third control unit 102c may receive a command from third interactive display 114c, recognize that second control unit 102b controls HVAC services for that zone, and communicate the command to second control unit 102b using LANs 126b and 126a. In some embodiments, third control unit 102c may communicate the command to first control unit 102a using wireless networks 126b and 126a and first control unit 102a may relay the command to second control unit 102b using HVAC control network 124.

Thus, according to embodiments of FIG. 6, a distributed HVAC system 100 may provide the functionality and reliability described in FIGS. 1-5 despite being geographically dispersed across multiple access points.

HVAC Control Unit Device

The previous embodiments of FIGS. 1-6 have focused on the communication protocols and networks used by control units 102 when operating in HVAC system 100. FIGS. 7 and 8 provide technical details of the hardware, interfaces, and applications that enable control units 102 to provide integrated control and management of HVAC system 100.

FIG. 7 is a block diagram 700 illustrating an example control unit 102a. Block diagram 700 comprises a number of ports and interfaces that allow control unit 102 to manage and control devices in HVAC system 100. Although block diagram 700 illustrates a few example features of control unit 102a, these features are non-limiting. Control unit 102a includes any ports or connections, real or virtual, including any suitable hardware and/or software, including protocol conversion and data processing capabilities to facilitate communications between RSBus 108a and one or more HVAC units 104, user devices 110, sensors 112, interactive displays 114, access points 116, remote devices 122, and other control units 102b-n.

In the illustrated embodiment, control unit 102a comprises RSBus interface 710, universal asynchronous receiver/transmitter (UART) ports 720, secure digital input output (SDIO) port 730 interfaced with wireless module 740, inter-integrated circuit (I2C) port 750 interfaced with control unit temperature sensor 760, universal serial bus (USB) host port 770, memory 780, clock 785, and processor 790. Control unit 102a may also comprise power unit 714, one or more indicator LEDs 716, Ethernet port 775, and push button 795.

RSBus interface 710 may operate as part of a controller area network (CAN) transceiver. RSBus interface 710 may facilitate communication with one or more HVAC units 104a and 106a using RSBus 108a. RSBus interface 710 may be configured to receive 2-, 3-, or 4-wire connections. In some embodiments, RSBus interface 710 is designed for a 4-wire communication protocol comprising a power line, a ground, a high signal line, and a low signal line. RSBus interface 710 may be designed to operate with multiple HVAC units 104. For example, control unit 102a may control HVAC services for a residential home. RSBus interface 710 may connect to air-conditioning HVAC unit 104a and furnace HVAC unit 106a. In other embodiments, RSBus interface 710 may connect with a single HVAC unit 104a.

UART ports 720 may provide wired communication to a number of devices in system 100 as well as operate as a debugging port when troubleshooting control unit 102a. For example, control unit 102a may control a commercial refrigeration HVAC system. UART ports 720 may interface with an RS-485 module for communicating with HVAC unit 104a in such a system. Additionally, UART ports 720 may provide an RS-232 module for technicians to use when troubleshooting control unit 102a. In certain embodiments, interactive display 114 may be wired to UART ports 720 using an RS-485 communication module. A number of design and technical advantages may be realized by wiring interactive display to control unit 102a. Wiring interactive display 114 to control unit 102a may reduce the number of components needed to operate interactive display 114. For example, antennas and memory for interactive display 114 may be moved to control unit 102a. This may allow for ultra-thin designs for interactive display 114 and reduce the power interactive display 114 consumes by operating wirelessly.

SDIO port 730 interfaced with a wireless module 740 may facilitate wireless communications using any appropriate protocol, including IEEE 802.11 (Wi-Fi), 802.15 (ZigBee), and Bluetooth among others. In some embodiments, wireless module 740 may allow for 802.11b/g/n communications and Wi-Fi direct protocols. SDIO port 730 interfaced with wireless module 740 may allow control unit 102a to communicate with user devices 110, sensors 112, interactive display 114, remote device 122, and other control units 102b-n using HVAC control network 124 and LAN 126. For example, the Wi-Fi module may communicate with a sibling control unit using a Wi-Fi direct protocol negotiated using a Wi-Fi protected setup standard. In some embodiments, control unit 102a may include an external antenna 745 to provide long-range wireless communications.

I2C port 750 may be interfaced with temperature sensor 760 to measure the ambient temperature of the area housing control unit 102a. Temperature sensor 760 may be any temperature sensor operable to measure an ambient temperature and communicate the reading to control unit 102a via I2C port 750.

USB host port 770 may facilitate USB access to control unit 102a. In some embodiments, a USB to Ethernet dongle may allow control unit 102a to communicate with network 120 and control server 118 without using access point 116. USB host port 770 may support USB 2.0, USB 3.0, and USB Type-C functionality. USB host port 770 may also be able to receive manual firmware upgrades using a USB device.

Memory 780 represents any suitable memory operable to store configuration details, boot code, picture files, and software for control unit 102a. As an example, and not by way of limitation, memory may comprise EEPROM of a sufficient size (e.g., 16 kB) to store configuration details for control unit 102a and HVAC unit 104 parameters. Memory 780 may include DDR3 SDRAM or other comparable memory that allows for high speed processing. In some embodiments, memory 780 may include a secure digital high capacity (SDHC) port to receive SD flash memory cards to store information, such as boot code for control unit 102a. SD flash memory may also store and upload pictures to interactive display 114.

Clock 785 represents any hardware or software operable to maintain an internal time for control unit 102a. In some embodiments, clock 785 includes a Real Time Clock (RTC) chip. In some embodiments, the RTC chip may be used to time stamp software, system changes, settings updates, and log data in control unit 102a.

Processor 790 may execute any suitable operating system such as IBM's zSeries/Operating System (z/OS), MS-DOS, PC-DOS, MAC-OS, Android, WINDOWS, UNIX, OpenVMS, Linux, or any other appropriate operating systems, including future operating systems. Processor 790 may execute computer-executable program instructions stored in memory 780. Processor 790 may include, but is not limited to, a microprocessor, an application specific integrated circuit (ASIC), and or state machines. Processor 790 may also facilitate communications between RSBus interface 710, UART ports 720, SDIO port 730 interfaced with a wireless module 740, I2C port 750, and USB host port 770.

Power unit 714 may comprise one or more power modules to ensure proper operation of the interfaces and ports of control unit 102a. In some embodiments, power unit 714 may receive a 24V AC input signal. Power unit 714 may convert the 24V AC input to other signals using a number of converters. For example, power unit 714 may comprise a 24V AC-DC converter, a 24V DC to 5V DC and 3V DC convertor for internal operations. Power unit 714 may also include a 24V DC to 12V DC converter for providing power to interactive display 114 when interactive display 114 connects to control unit 102a over UART ports 720.

One or more indicator LEDs 716 may provide visual indications to a user or a technician regarding the operating condition of control unit 102a. As an example, and not by way of limitation, control unit 102a may comprise a circular LED to indicate whether control unit 102a is connected to control unit 102b. A user may press push button 745 to initiate a Wi-Fi direct, push button configuration. Indicator LED 716 may produce a green blinking light until the acceptance window to connect to other Wi-Fi direct devices closes. Once the acceptance window closes, the green light may end. If control unit 102a detects and connects to control unit 102b during the acceptance window, indicator LED 516 may transition from a blinking green light to a solid green light. If control unit 102a detects control unit 102b but fails to connect to control unit 102b, indicator LED 716 may transition from a blinking green light to a sold blue or red light. In some embodiments, a similar indicator or ring notification may display on interactive display 114. This may allow users and technicians to detect when first control unit 102a connects to other control units 102b-n without having to directly access control unit 102a. Accordingly, users and technicians may easily determine whether control unit 102a establishes communication with other control units 102b-n.

Control Unit Hardware Operation

The following embodiments describe the interaction and functionality of interfaces and ports described in FIG. 7. The interfaces and ports of control unit 102a may allow control unit 102a to operate as a network bridge between HVAC units 104 and a number of other devices in system 100.

For example, SDIO port 730 interfaced with wireless module 740 may receive a temperature reading from sensor 112 over LAN 126. Processor 790 may receive the temperature reading in an 802.11 Wi-Fi communication protocol and convert it into an RS-485 communication protocol. UART ports 720 may then facilitate the communication of the temperature reading to interactive display 114. Processor 790 may also determine that the temperature reading is outside a set temperature range for a zone covered by sensor 112. Processor 790 may instruct HVAC unit 104 to adjust the temperature of the zone by communicating a command to HVAC unit 104a using an RSBus protocol over RSBus interface 710.

In another example, SDIO port 730 interfaced with wireless module 740 may detect and connect with user device 110 using a Wi-Fi direct protocol over HVAC control network 124. Once connected, user device 110 may communicate a temperature adjust command to control device 102a, which is received by wireless module 740. In some embodiments, wireless module 740 receives the temperature adjust command from user device 110 in a TCP/IP protocol. Processor 790 may convert the temperature adjust command from the TCP/IP protocol into the RSBus protocol and transmit the temperature adjust command to HVAC unit 104 over RSBus 108 using RS-BUS interface 510.

As another example, SDIO port 730 interfaced with wireless module 740 may detect and connect with control unit 102b over HVAC control network 124 using Wi-Fi direct. Wireless module 740 may utilize a Wi-Fi protected setup standard to facilitate secure communications over HVAC control network 126.

In some embodiments, UART ports 520 are operable to facilitate communication with a debugging apparatus using an RS-232 communication protocol. For instance, in certain embodiments a technician diagnosing control unit 102a may need to perform tests on control unit 102a. By accessing debugging interfaces that are part of UART ports 520, the technician may be able to read, measure, or provide signals to control unit 102a that may not otherwise be possible with just mobile troubleshooting device 526.

Control unit 102a may communicate with interactive display 114 over LAN 126 instead of UART port 520. SDIO port 730 interfaced with wireless module 740 may receive a temperature adjust command from interactive display 114. In some embodiments, the temperature adjust command may be in a TCP/IP protocol. Processor 790 may convert the TCP/IP protocol to an RSBus protocol. Processor 790 may then determine that the temperature command is for HVAC unit 104b controlled by control unit 102b. Processor 790 may determine this based on the control unit associated with the zone or room that temperature adjust command was received for. Wireless module 740 may communicate the temperature control command to control unit 102b over HVAC control network 124.

Control unit 102a may also connect to access point 116 by having SDIO port 730 interfaced with wireless module 740 detect and connect to LAN 126. For example, LAN 126 may be a WLAN using an 802.11 protocol. Once connected to access point 116, control unit 102a may access network 120 and connect with control server 118. As explained in greater detail in FIGS. 7-8, once control unit 102a connects with control server 118, control server 118 may establish a persistent control connection with control unit 102a. Using the control link, wireless module 740 may receive firmware upgrades for control unit 102a, HVAC unit 104a, sensor 112, and interactive display 114. For example, if control unit 102a receives a firmware upgrade for HVAC unit 104a from control server 118 in a first protocol such as TCP/IP. Processor 790 may convert the firmware upgrade from the first protocol into the RSBus protocol and communicate the firmware upgrade to HVAC unit 104a using RSBus interface 710.

A component of control unit 102 may include an interface, logic, memory, and other suitable elements. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more microprocessors, one or more applications, and other logic.

Modifications, additions, or omissions may be made to block diagram 700 and control unit 102a without departing from the scope of the disclosure. For example, control unit 102a may further comprise an Ethernet port 775, enabling control unit 102a to connect to a router and access network 120 without needing access point 116. As another example, RSBus interface 710 may be a fiber optic communication channel.

As yet another example, control unit 102a may communicate with remote device 122 using a USB Ethernet dongle connected to USB host port 770. Control unit 102a may receive a temperature adjust command from remote device 122 through USB host port. Processor 790 may convert the temperature adjust command to the RSBus protocol and communicate the temperature adjust command to HVAC unit 104a using RSBus interface 710. Any suitable logic stored in memory 780 may perform the functions of block diagram 700 and the components within control unit 102a.

Control Unit Software Architecture

To manage and control operations and communications in HVAC system 100, control unit 102a may include a number of applications and databases. The applications and databases described in FIG. 8 may be stored and operated from any suitable location such as memory 780, SD flash memory interfaced with an SDHC port, or control server 118. Embodiments of FIG. 8 detail the interaction and communication protocols used by applications when storing and retrieving data. As explained below, the processes invoked by the database of control unit 102a may provide a number of technical advantages when operating a distributed HVAC system 100.

FIG. 8 is a block diagram 800 illustrating example control systems and applications provided by a control unit 102a. Block diagram 800 comprises HVAC equipment interface 810, IO ports 820, database 830, and applications 840, which may be used to operate control unit 102a and communicate with user device 110, sensors 112, interactive display 114, access point 116, control server 118, remote device 122, and other control units 102b-n.

HVAC equipment interface 810 comprises system controller 812 and RSBus 108. Input/output (JO) module 820 comprises local gateway 826 and remote gateway 828. Control unit 102a may also comprise one or more databases 830 for receiving, storing, and retrieving data for HVAC system 100. Applications 840 comprise a number of programs run on control unit 102a including firmware manager 842, authentication manager 844, analytics program 846, scheduler program 848, user content manager 850, weather program 852, occupancy control 854, and safety monitor 856.

System controller 812 is responsible for controlling HVAC units 104 and 106 in system 100. System controller 812 may discover the number, type, and configuration of HVAC units 104 and 106 used in system 100. For example, system controller 812 may determine that RSBus 108a connects control unit 102a to an air-conditioning unit 104a and a furnace 106a as part of a residential HVAC system. In some embodiments, system controller 812 may determine that UART ports 720 facilitate communication with a commercial refrigeration system. System controller 812 may publish the number, type, and configuration of HVAC units 104 and 106 to database 830. System controller 812 may also update database 830 with the status of other control units 102b-n. In some embodiments, system controller 812 may also communicate firmware and parameter updates from firmware manager 842 and control server 118 to HVAC units 104a and 106a.

Local gateway 826 facilitates secure communications between control unit 102a and devices connecting locally using wireless module 740 and UART ports 720. Local gateway 826 may manage communications with the devices communicating over HVAC control network 124, LAN 126, and any wired network (e.g., a wired interactive display 114 using UART ports 720). In some embodiments, control unit 102a may have an Ethernet port also managed by local gateway 826. Local gateway 826 manages the synchronization of data between control unit 102a and interactive display 114, control units 102b-n, sensors 112, and user devices 110.

In certain embodiments, local gateway 826 may automatically choose the preferred protocol (i.e., Wi-Fi, Wi-Fi direct, 2-wire, Ethernet) to communicate with devices in HVAC system 100. For example, control unit 102a may generate HVAC control network 124 and act as Group Owner (GO) of HVAC control network 124. Local gateway 826 may then determine that the preferred communications method with control units 102b-n is Wi-Fi direct. Local gateway 826 may designate different preferred protocols for different devices. For example, in some embodiments, sensor 112 may be outside of HVAC control network 124 but within range of LAN 126. Local gateway 826 may designate a Wi-Fi protocol as the preferred communications method for control unit 102a to communicate with sensor 112.

Local gateway 826 may use the same application program interface (API) as control server 118 so that users interacting with control unit 102a using application 111 on user device 110 encounter the same GUI offering the same commands regardless of whether the user is communicating locally or remotely. This enables control unit 102a, to present a uniform display to a user regardless of how the user controls HVAC system 100.

Remote gateway 828 facilitates secure communications between control unit 102a and control server 118 using wireless module 540. Remote gateway 828 may synchronize the communication of control data and notifications with control server 118. Similar to local gateway 826, remote gateway 828 may automatically choose the preferred interface (e.g., Wi-Fi, ZigBee, Ethernet) to communicate with control server 118. In some embodiments, this may include managing control and notification connections between control unit 102a and control server 118.

Database 830 stores, either permanently or temporarily, data and other operational information for processor 790 and applications 840. In some embodiments, database 830 is stored in memory 780. In some embodiments, control server 118 may operate as a cloud storage device and a portion or all of database 830 may be stored remotely on control server 118.

In certain embodiments, database 830 may operate using a publish-subscribe (pub-sub) data delivery method, wherein applications 840 and devices may publish data to database 830 and subscribe to certain types of data stored in database 830. Using this push/pull protocol, application 840 and devices (i.e., control units 102, sensors 112, interactive display 114, control server 118) may publish data to database 830 without identifying a specific recipient. Instead, each device and application 840 may subscribe to certain types of data in database 830.

For example, sensor 112c located in second zone 250 may measure an ambient temperature of living room 270. Sensor 112c may publish the temperature reading to database 830 using HVAC control network 124. Once database 830 receives the temperature reading, a number of subscribers may access or retrieve the temperature reading. For instance, schedule manager 848 may subscribe to database 830 and receive temperature readings as they are published to database 830. Schedule manager 848 may then determine whether the temperature of second zone 250 is within a preset temperature range. Interactive display 114 may also subscribe to temperature readings published to database 830. Interactive display 114 may receive the temperature reading published by sensor 112c and display the temperature reading of living room 270. In this manner, sensor 112c may simply publish a temperature reading to database 830 without identifying specific applications or devices that may want the temperature reading.

Using a pub-sub data delivery method provides technical benefits for a distributed HVAC system with multiple devices and components. A pub-sub data delivery method may provide for asynchronous communication between devices that allows the distributed HVAC system to be customized, expandable, and able to operate in an autonomous fashion. Furthermore, although described as a pub-sub delivery system, control unit 102a may use any database and processing system that facilitates communication between applications 840 and devices in HVAC system 100. For instance, control unit 102a may comprise one or more relational databases.

Firmware manager 842 may be responsible for downloading firmware from control server 118 in a non-intrusive an efficient manner. Because HVAC unit 104a may need to be shut down while control unit 102a uploads a firmware upgrade, firmware manager 842 may update control unit 102a while HVAC unit 104a is already off. For example, to determine the best time to update HVAC unit 104a, firmware manager 842 may interact with schedule program 848 to determine when the next down period will be, for instance when the user leaves for work. Firmware manager 842 may then update HVAC unit 104a with the new firmware. Thus, the user will not notice a loss of HVAC services while firmware manager 842 updates control unit 102a or HVAC unit 104 with new firmware.

Firmware manager 842 may also work with control server 118 to maintain the control link that facilitates communication between control server 118 and control unit 102a through remote gateway 828. In some embodiments, firmware manager 842 may communicate the status of downloads and uploads to interactive display 114. If control unit 102a is connected with control unit 102b, firmware manager 842 may ensure that both control units 102 are using compatible firmware. This may prevent communication errors due to updates in system programs.

Authentication manager 844 maintains and tracks accounts that connect with control unit 102a. For example, a legacy control unit 102c may attempt to reconnect with control unit 102a. Authentication manager 844 may have a stored account for control unit 102c and may authorize communications with control unit 102c without performing additional authentication steps. In another embodiment, authentication manager 844 may store a record of each user device 110 that has previously been authenticated. This may allow user device 110 to connect automatically with control unit 102a upon detecting it over LAN 126 or HVAC control network 124. In a similar manner, authentication manager 644 may store and authenticate sensors 112 and interactive display 114.

Analytics program 846 may provide HVAC analytics for control unit 102a. Over time, analytics program 846 may collect and store data in database 830 or control server 118 regarding the usage of HVAC unit 104 and the energy consumption of control unit 102a, HVAC unit 104a, sensors 112, and interactive display 114. Furthermore, analytics program 846 may run a smart lifestyle program that learns the habits and preferences of a user. For example, analytics program 846 may learn the work schedule of the user and determine the most energy-efficient time to run HVAC unit 104 to achieve the proper temperature settings. Analytics program 846 may be able to suggest changes to schedule program 848 that would save the user money by operating HVAC unit 104 during lower priced periods. Analytics program 846 may also use energy consumption information based on current HVAC unit 104a and determine how much energy would be saved by changing to an upgraded or different HVAC model.

Schedule program 848 may manage and control the schedule settings for control unit 102a. In some embodiments, a user may access scheduler program 848 by connecting to control unit 102a using interactive device 114 or user device 110. The user may setup a schedule that determines the temperature settings for specific times and days of the week. Schedule program 848 may also coordinate with database 830 to determine what zones are available to monitor and control. For example, a user may input a certain schedule for second zone 250 using interactive display 114a. Control unit 102a may be connected to control unit 102b and therefore able to detect second zone 250 and HVAC unit 104b. Schedule program 848 running on control unit 102a may determine when control unit 102a should send temperature control commands to control unit 102b over HVAC control network 124 or LAN 126 to control HVAC unit 102b. In some embodiments, schedule program 848 may synchronize calendars with corresponding schedule program 848 running on controller unit 102b. In this manner, even if communications are interrupted between control units 102a and 102b, control unit 102b may still be able to maintain the scheduled temperatures.

User content manager 850 may allow a user to customize interactive display 114 with a custom screen saver or customize the way user device 110 receives messages. For example, a user may indicate that messages should be sent to user device 110 using email. The user may then provide the preferred email address. In another embodiment, the user may indicate that a text message is the preferred means of communication. In another embodiment, the user may indicate an HVAC application on user device 110 is the best way to communicate with the user. Accordingly, user content manager 850 may customize the way control unit 102a communicates with users.

Weather program 852 facilitates the pulling of weather information from control server 118. As described in FIGS. 11 and 12, weather program 852 may periodically pull weather data from weather program 852. Weather program 852 may pull the reports at the same time every day (e.g., 7:00 am or 12:00 pm), or weather program 852 may be instructed to pull the reports at regular intervals (e.g., every hour). In some embodiments, weather program 852 may pull weather information from control server 118 in response to control server 118 not pushing weather data for a given period (e.g., every three hours). Weather program 852 may publish the weather data in database 830 for other programs to subscribe.

Occupancy control 654 may allow control unit 102a to determine which zones, and which rooms within the zones, are occupied by users. For example, sensors 112 may measure noise levels within a room. In some embodiments, sensors 112 may be a motion sensor operable to detect movement within a room. Control unit 102a may receive noise and/or motion sense data from sensors 112 and publish the data to database 830. Occupancy control 654 may subscribe to noise and motion sense data and determine which zones and rooms should be provided HVAC services.

As an illustration, sensor 112c may detect high noise levels in living room 270 of second zone 250. Sensors 112a and 112b may comprise motion sensors, which may detect little or no motion in bathroom 230 and bedroom 240. Control unit 102a may receive this noise and motion data and publish it to database 830. Occupancy control 854 may retrieve this information and determine that one or more users are in living room 270 and alert system controller 612 that HVAC services should be provided to second zone 250. Control unit 102a may then determine that HVAC unit 104b controls second zone 250. Control unit 102a may transmit a temperature command to control unit 102b using HVAC control network 124. Accordingly, occupancy control 854 may create a targeted HVAC system able to provide targeted HVAC services.

Safety monitor 856 may work with temperature sensor 760 to determine whether the ambient temperature of the location of control unit 102a is outside safe operating conditions. For example, a fan cooling control unit 102a may fail. Temperature sensor 760 may determine that the ambient temperature around control unit 102a is outside safe operating conditions (e.g., 140° C.). Safety monitor 854 may alert processor 790 causing control unit 102a to send an alert message to user device 110 indicating the unsafe operating temperatures. The user may then take appropriate action before control unit 102a shuts down.

In some embodiments, HVAC system 100 may have one or more sensors 112 that are operable to measure air quality. Safety monitor 856 may work with air quality sensors 112 to monitor the air quality of HVAC system 100. In some embodiments, if safety monitor 856 determines that the air quality reaches an unsafe level it may send an alert to user device 110 and/or display the air quality on interactive display 114. In some embodiments, the air quality level may be sent as a universal setting to alert all control units 102 in HVAC system 100. Safety monitor 856 and air quality sensors 112 may measure any number of air pollutants including but not limited to carbon monoxide, ozone, particle matter, nitrogen dioxide, sulphur dioxide, and hydrogen dioxide. In some embodiments, first control unit 102a may control an air-cleaning device that may be activated if safety monitor 856 determines that the air quality is at an unsafe level.

Modifications, additions, or omissions may be made to block diagram 800 and control unit 102a without departing from the scope of the disclosure. For example, control unit 102a may further comprise a configuration manager that is responsible for storing and restoring control unit 102a configurations that are received from USB host port 770. Configuration manager may also communicate the current configurations of control unit 102a to control server 118. Any suitable logic may perform the functions of block diagram 600 and the components within control unit 102a.

Although applications 840 are shown as part of control unit 102a, control server 118 may provide additional applications that may be downloaded by control unit 102a to increase operational efficiency or provide added control to users. As the following sections detail, control server 118 may augment the abilities of control units 102 by providing a number of services or options to expand the operations of HVAC system 100

Server Interaction in an HVAC System

Figure 9:
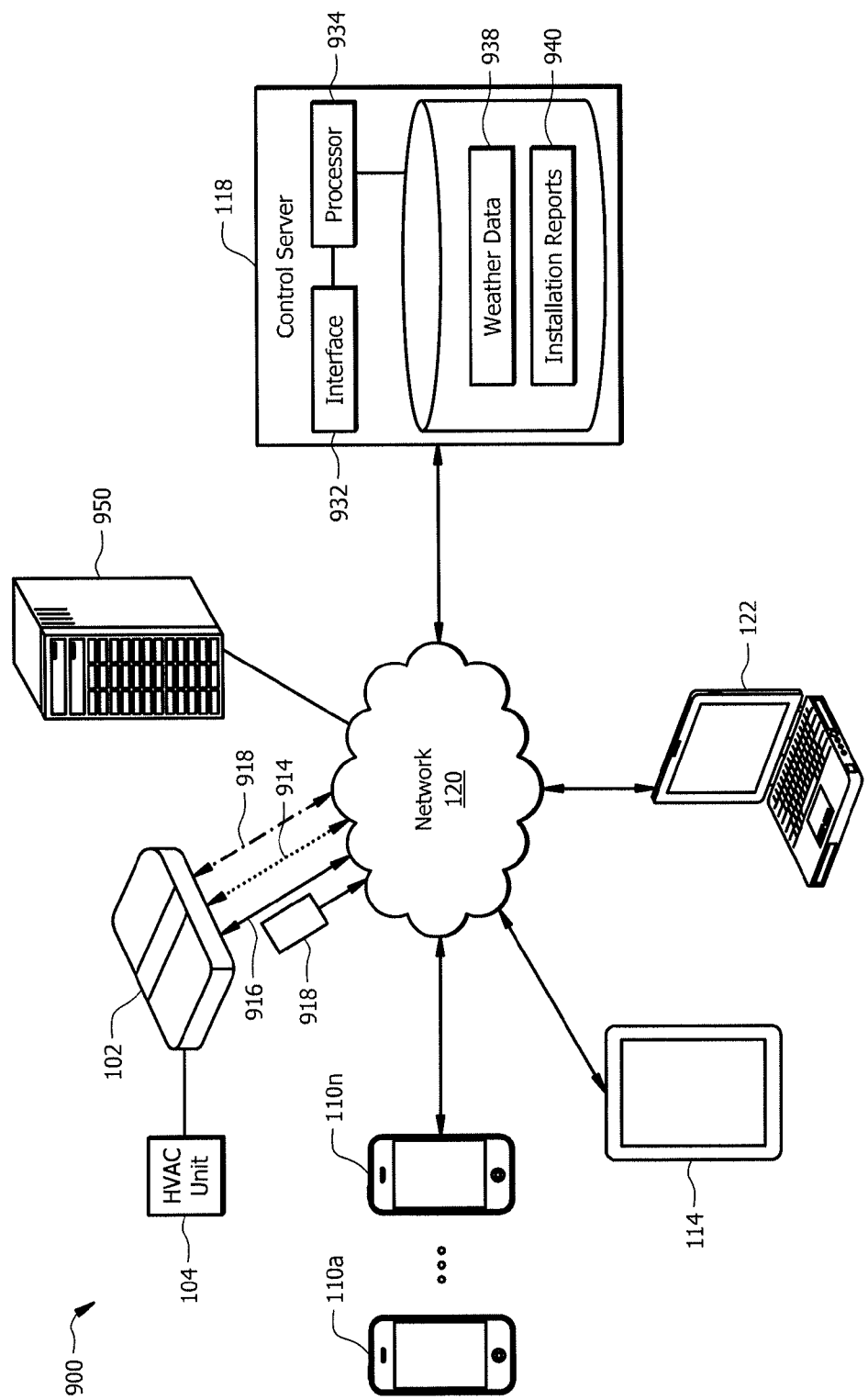
FIG. 9 is a diagram illustrating an example system for communications with an HVAC control server.

FIGS. 9-12 detail a number of ways control server 118 may interact and enhance HVAC system 100. FIG. 9 is a diagram illustrating an example system 900 for facilitating communications with a control server 118 and control unit 102a. Embodiments of the present disclosure may also provide solutions that facilitate secure, transparent, and efficient communication between control units 102, control server 118, and other devices in system 900.

System 900 comprises network 120 that facilitates communication between control unit 102a, user device 110, interactive display 114, remote device 122, control server 118, and application server 950. In the illustrated embodiment, control server 118 includes an interface 932, a processor 934, and a memory 936, which comprises weather data 938, and installation reports 940.

Interface 932 represents any suitable device operable to receive information from network 120, transmit information through network 120, perform suitable processing of information, communicate to other devices, or any combination thereof.

Interface 932 represents any port or connection, real or virtual, including any suitable hardware and/or software, including protocol conversion and data processing capabilities, to communicate through network 120, LAN 126, WAN, or other communication system that allows control server 118 to exchange information with control unit 102a, user devices 110a-n, interactive display 114, remote device 122, and application server 950.

For example, interface 932 may utilize a number of communication channels (i.e., notification, control, and download connections) with control unit 102a depending on the type, size, and content of communications between control server 118 and control unit 102a. As described in FIGS. 11 and 12, interface 932 may use notification connection 914, control connection 916, and download connection 918 for different purposes. By distinguishing between communication channels, control server 118 may be able to strategically utilize communication resources and efficiently allocate bandwidth.

As an illustrative example, control server 118 may transmit a notification to control unit 102a using notification connection 914. The notification may simply include an indication that control server 118 has a message and/or command for control unit 102a. Control unit 102a may then use control connection 916 to retrieve the message and any corresponding data. In some embodiments, notification connection 914 and control connection 916 may be persistent links between control server 118 and control unit 102a. In some embodiments, notification connection 914 is a persistent link and control connection 916 is an on demand link.

Download connection 918 may be established between control server 118 and control unit 102a whenever a large file needs to be transferred, such as a firmware upgrade. Because download connection 918 utilizes more resources than notification connection 914 and control connection 916, download connection 918 may be setup on demand. In certain embodiments, notification connection 914 and control connection 916 may be setup using a secure communication connection such as https, while download channel 718 may use a standard connection such as http.

Although notification connection 914, control connection 916, and download connection 918 are illustrated as existing between control unit 102a and control server 118, these connections may also be established between user devices 110, application server 950, interactive display 114, remote device 122, or any other appropriate device in system 900.

Processor 934 communicatively couples interface 932 and memory 936 and controls the operation of control server 118. Processor 934 includes any hardware and software that operates to control and process information. Processor 934 may execute computer-executable program instructions stored in memory 936. Processor 934 may include, but is not limited to, a microprocessor, an application specific integrated circuit (ASIC), and or state machines.

Memory 936 may store information in one or more databases, file systems, tree structures, any other suitable storage system, or any combination thereof. Furthermore, different information stored in memory 936 may use any of these storage systems. Moreover, any information stored in memory 936 may be encrypted or unencrypted, compressed or uncompressed, and static or editable. Although illustrated as including particular modules, memory 936 may include any suitable information for use in the operation of control server 118. In the illustrated embodiment, memory 936 includes weather data 938 and installation reports 940.

In certain embodiments, control unit 102a may register with control server 118 upon being activated in HVAC system 100. As described below in FIG. 10, control unit 102a may communicate a registration request 918 to control server 118. Registration request 918 may comprise an installation report providing details about HVAC system 100 that control unit 102a operates. The installation report may comprise serial numbers for control units 102, HVAC units 104, sensors 112, and interactive displays 114. The installation report may also include operating parameters for HVAC units 104, a geographic address of control unit 102a (e.g., GPS coordinates or a street address), and a user name/login password for accessing control units 102. In some embodiments, installation report may include the universal settings stored by control unit 102a.

After receiving registration request 918, control server 118 may authenticate control unit 102a. In some embodiments, control server 118 may authenticate registration request 918 by comparing the serial numbers of control unit 102a, HVAC unit 104, and interactive display 114 to a list of approved serial numbers stored on control server 118. Control server 118 may communicate the serial numbers to remote device 122, which may represent an approved HVAC dealer. Remote device 122 may authenticate the serial numbers and send an approval message to control server 118. In some embodiments, approved serial numbers may be listed based on units sold by approved dealers. In some embodiments control server 118 may authenticate just control unit 102a and in other embodiments, control server 118 may authenticate all components of HVAC system 100. Once authenticated, control server 118 may store the installation report in installation report database 940.

Once the authorization process is complete, control server 118 may register a primary user device 110a with control unit 102a. Control server 118 may also register a secondary user device 110b with control unit 102a. In some embodiments, control server 118 may grant primary user device 110a additional privileges that are not granted to secondary user device 110b, such as changing the user name or password associated with HVAC system 100. Once primary user device 110a and secondary user device 110b are registered, control server 118 may establish notification connection 914 and control connection 916 with each device. This registration of user devices 110 may facilitate seamless communication between user devices 110 and control unit 102a when user devices 110 are outside HVAC control network 124 and LAN 126.

For example, a user on secondary user device 110b may communicate a temperature change request to control server 118. The user may go through control server 118 because the user is away from home 210 and unable to connect with HVAC control network 124 and LAN 126. Control server 118 receives the temperature change request and sends a notification message over notification connection 914 to control unit 102a. Control unit 102a may respond by transmitting a retrieve request to control server 118 over notification connection 914. Control server 118 may then transmit the temperature change request using control connection 716 to control unit 102a. Once control unit 102a receives the temperature change request, it may notify control server 118 by communicating a confirmation notification to control server 118 using notification connection 914.

Control server 118 may confirm with secondary user device 110b that the temperature change request was successfully transmitted to control unit 102a. Control server 118 may send a notification alert to secondary user device 110b over a notification connection, receive a retrieve request from secondary user device 110b over notification connection, and transmit the confirmation notification from control unit 102a to secondary device 110b.

In some embodiments, control server 118 may recognize that secondary user device 110b requested the temperature change. In addition to confirming the temperature change with secondary user device 110b, control server 118 may confirm the temperature change with primary user device 110a using a similar notification procedure. In certain embodiments, control server 118 may capture all communications made between endpoints for a specified period (e.g., 30 days). This may allow a user to review when changes were made to control unit 102a and who made the changes. This may also allow a technician to troubleshoot potential problems based on when the issues occurred.

In some embodiments, remote device 122 represents the HVAC dealer who sold or installed HVAC unit 104. HVAC dealer may use remote device 122 to retrieve operating parameters associated with HVAC unit 104. Remote device 122 may communicate a request to control server 118 to access control unit 102a. Control server 118 may transmit an authorization request to primary user device 110a to retrieve permission from the user before allowing access to the data from control unit 102a. The user may transmit an authorization approval to control server 118 using primary user device 110a. Upon receiving the authorization approval, control server 118 may communicate the stored operating parameters for HVAC unit 104 received from control unit 102a. In this manner, control server 118 may send the requested data to the HVAC dealer without allowing the HVAC dealer to access control unit 102a.

In some embodiments, control server 118 receives an indication from control unit 102a that control unit 102a is using outdated software. Firmware manager 842 may alert control unit 102a that a new firmware upgrade is available. A request for the firmware upgrade may be communicated to control server 118 over notification connection 914. Control server 118 may establish download link 718 with control unit 102a based on the large size of the firmware upgrade. Once download link 718 is established, control server 118 may upload the firmware upgrade to control unit 102a. After the upload is complete, control unit 118 may tear down download link 718 to conserve communication resources.

In the illustrated embodiment, control server 118 may communicate with application server 950. Application server 950 may comprise a number of third party applications or services used to customize control unit 102a. For instance, application server 950 may provide weather data to control server 118. Control server 118 may communicate the geographic location of control unit 102a to application server 950 and receive weather forecast data for the geographic location of control unit 102a. Control server 118 may then store the data in weather database 738 and transmit the weather data to control unit 102a at predetermined intervals (e.g., every six hours).

In some embodiments weather program 852 may establish when control server 118 should transmit the weather data. Additionally or alternatively, control server 118 may transmit the weather data to control unit 102a in response to receiving a request from control unit 102a. User devices 110 may also send control unit 118 weather requests. In response, control server 118 may transmit the weather data to user devices 110.

Modifications, additions, or omissions may be made to block system 900 without departing from the scope of the disclosure. For example, although user devices have been described as communicating temperature control commands to control unit 102a using control server 118, user devices 110 may interact with one or more applications 840 running on control unit 102a. For example, primary user device 110a may update schedule program 848 remotely using control server 118. In some embodiments, control unit 102a may use control server 118 as a cloud storage system. This may reduce the memory requirements for control unit 102a while allowing user devices 110 to access up-to-date information of control unit 102a even if they are outside home 210.

HVAC System Registration

When control units 102 are initially activated, it may be beneficial for each control unit 102 to register with control server 118. This may ensure that HVAC systems 100 are operating using approved devices. It also may allow HVAC dealers to keep track of the type and number of control units 102 used in HVAC system 100. In this manner if an HVAC dealer needs to recall control units 102, or send notifications to users operating a specific model of HVAC unit 104, the HVAC dealer may do so in a quick and efficient manner. Thus, registering control units 102 may provide a number of technical advantages to users and dealers.

Figure 10:
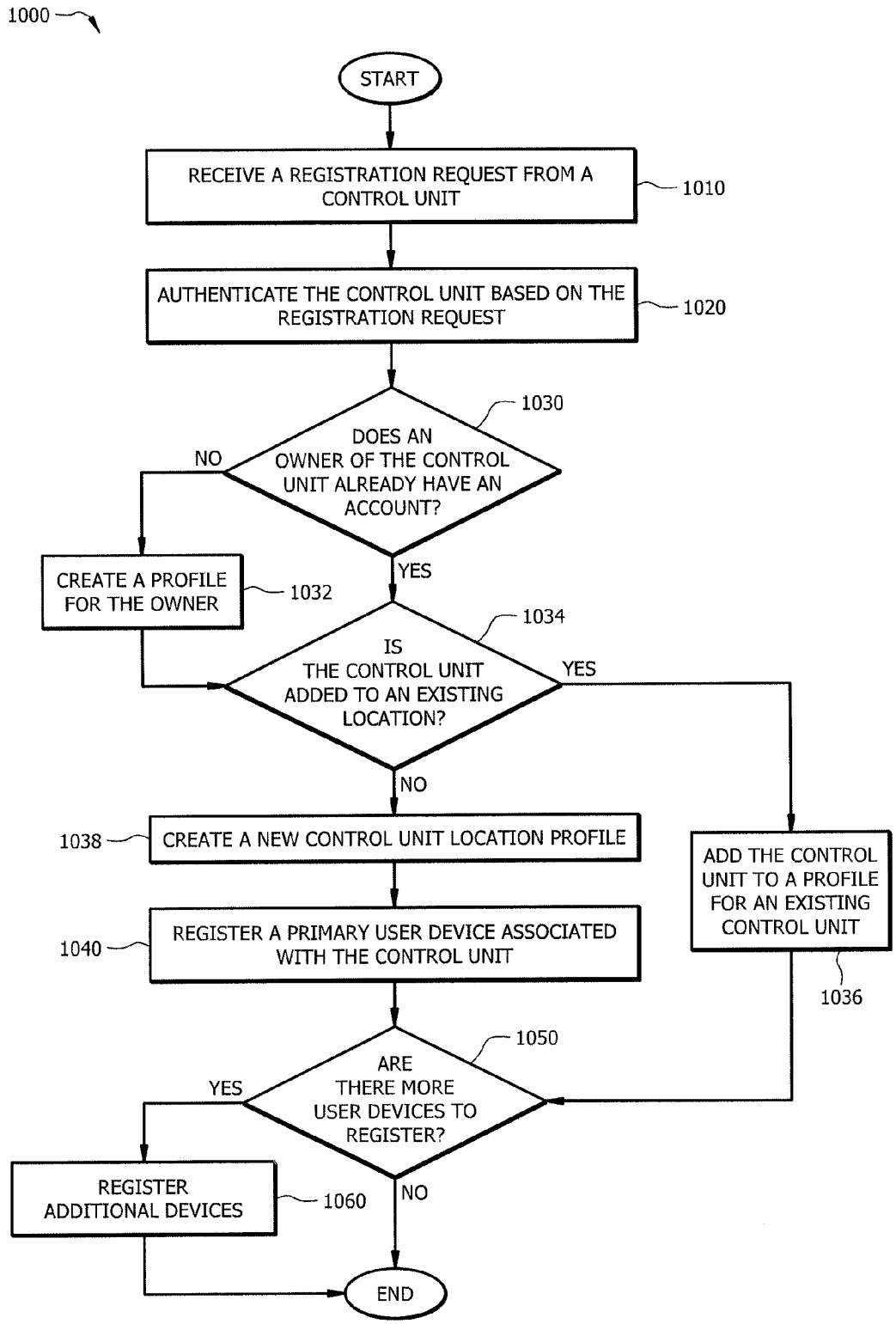
FIG. 10 is a flowchart showing a method of registering an HVAC control unit with a HVAC control server.

FIG. 10 is a flowchart showing a method 1000 for registering control unit 102a with control server 118. At step 1010, control server 118 receives registration request 918 from control unit 102a. Registration request 918 may be sent to control server 118 by control unit 102a when control unit 102a is first activated. When control unit 102a first activates, it may determine whether it has previously registered with control server 118. If it has not, control unit 118 may connect to network 120 using a number of different methods. For example, control unit 102a may connect to network 120 using access point 116. Control unit 102a may then transmit registration request 918 to control server 118. In some embodiments, if control unit 102a is unable to connect with control server 118, control unit 102a may re-attempt registration at regular intervals (e.g., every sixty seconds).

Registration request 918 may comprise an installation report with important details regarding HVAC system 100. For instance, installation report may comprise a serial number for HVAC unit 104, a serial number for interactive display 114, a serial number for control unit 102a, operating parameters for HVAC unit 104, a geographic address of control unit 102a (e.g., GPS coordinates or a street address), and a user name/login password for an account with control server 118.

At step 1020, control server 118 authenticates control unit 102a based on registration request 918. In certain embodiments, authentication may rely on information provided in the installation report. Authentication may occur in a number of ways. For example, control server 118 may compare the number and type of devices connected to control unit 102a to a list of previously installed devices. Control server 118 may deny authentication if the HVAC system run by control unit 102a does not match the installed system. Additionally or alternatively, control server 118 may cross-check the serial numbers of one or more of control unit 102a, HVAC unit 104a, sensors 112, and interactive display 114. If one or more serial numbers do not match a stored list of approved serial numbers, control server 118 may not authenticate control unit 102a. In some embodiments, control server 118 may provide authentication by checking the serial numbers of each device in the HVAC system except for the serial number of control unit 102a. This may occur if control unit 102a is simply a replacement control unit in an existing HVAC system 100. Although several examples are described, any suitable authentication protocol may be used to authenticate control unit 102a.

In certain embodiments, control server 118 may allow control unit 102a to register despite failing authentication. Control server 118 may provide a limited subset of services for unauthenticated control units 102a. For example, control server 118 may not upload firmware upgrades to unauthenticated control units 102 but may transmit recall notices or severe weather alerts to unauthenticated control units 102.

At step 1030, control server 118 determines whether a user of control unit 102a has already created an account. Control server 118 may ask for a user name and password to register control unit 102a. The user may provide this information through interactive display 114, user device 110, or login to a user interface connected with control server 118. If the user does not have an account, the sequence proceeds to step 1032 to create a new user account. If the user does have an account, the sequence proceeds to step 1034.

At step 1032, control server 118 creates a profile for the user. The profile may include the devices in HVAC system 100 detected by control unit 102a. The profile may link the user name and password with the installation report sent as part of registration request 918. Accordingly, whenever a user adds new components to HVAC system 100, such as new HVAC unit 104b, control server 118 may update the user account based on the user name and password. Once the new profile is created, the sequence may proceed to step 1038.

At step 1034, control server 118 determines whether control unit 102a is being added to an existing HVAC system 100 or a new HVAC system. For instance, a user may move houses and bring control unit 102a to the new home. Although control unit 102a is already registered, the HVAC system of the new home may be different from the previous home. Control server 118 may update the user profile with the new HVAC system devices. In some embodiments, control unit 102a may simply be a replacement control unit at the same location. Control server 118 may determine based on the installation report that every device but control unit 102a is the same. This may indicate that control unit 102a is a replacement control unit. In certain situations, control unit 102a may be an additional control unit added to an existing HVAC system that already has at least one control unit 102b. If control unit 102a is added to an existing system 100, then the sequence proceeds to step 1036, if not the sequence proceeds to step 1038 to determine a new location profile for HVAC system 100.

At step 1036, control server 118 links control unit 102a to an existing profile of the system. The existing profile may already have information stored for existing HVAC units 104 and 106 and/or existing control units 102b-n. After adding control unit 102a to an existing profile, then the sequence may proceed to step 1050.

At step 1038, control server 118 creates a new location profile for control unit 102a. Control server 118 may identify the location of control unit 102a and determine each component at that location based on the installation report. Once the location information is added to the profile, the sequence may proceed to step 1040.

At step 1040, control server 118 may register and associate primary user device 110a with control unit 102a. By linking primary user device 110a with control unit 102a, control server 118 may communicate alerts and warnings to primary user device 110a. In some embodiments, control server 118 may establish notification connection 914 and control connection 916 with primary user device 110a. After registering primary user device 110a, the sequence may proceed to step 1050. A user may register a primary device with control server 118 by providing a phone number or email account to reach the user. At step 1050, control server 118 may determine whether the user wishes to register another device with control unit 102a. If the user does wish to register another device, then the sequence proceeds to step 1060. If not, then the registration process ends.

At step 1060, a user may wish to register and associate multiple user devices with control unit 102a. For example, a user may register a mobile phone as primary user device 110a, and one or more devices as secondary devices. For instance, secondary devices may include a spouse's mobile phone 110b, a home computer 110c, a tablet 110d, and a work desktop 110e. In certain embodiments, control server 118 may allow the user to designate which user devices 110 are primary devices and which are secondary devices. Once all devices 110a-e of the user are registered, the registration process may end.

Various embodiments may perform some, all, or none of the steps described above. For example, a user may have more than one home. Control server 118 may recognize the user based on a common user name for the two homes. Control server 118 may authenticate and register each system separately but allow the user to access them through the same login. While discussed as control server 118 performing these steps, any suitable component of HVAC system 100 may perform one or more steps of the method.

Publication of Server Data to a Control Unit

Control server 118 may interact with control unit 102a using a number of protocols. For example, control server 118 may publish information to control unit 102a while control unit 102a may also pull information from control server 118. According to embodiments described below, publishing and pulling information between devices may be done according to the pub-sub protocol discussed in FIG. 8. This may provide a number of technical benefits including the managing of communication resources and the efficient authentication and dissemination of data between applications 840 and devices in HVAC system 100.

Figure 11:
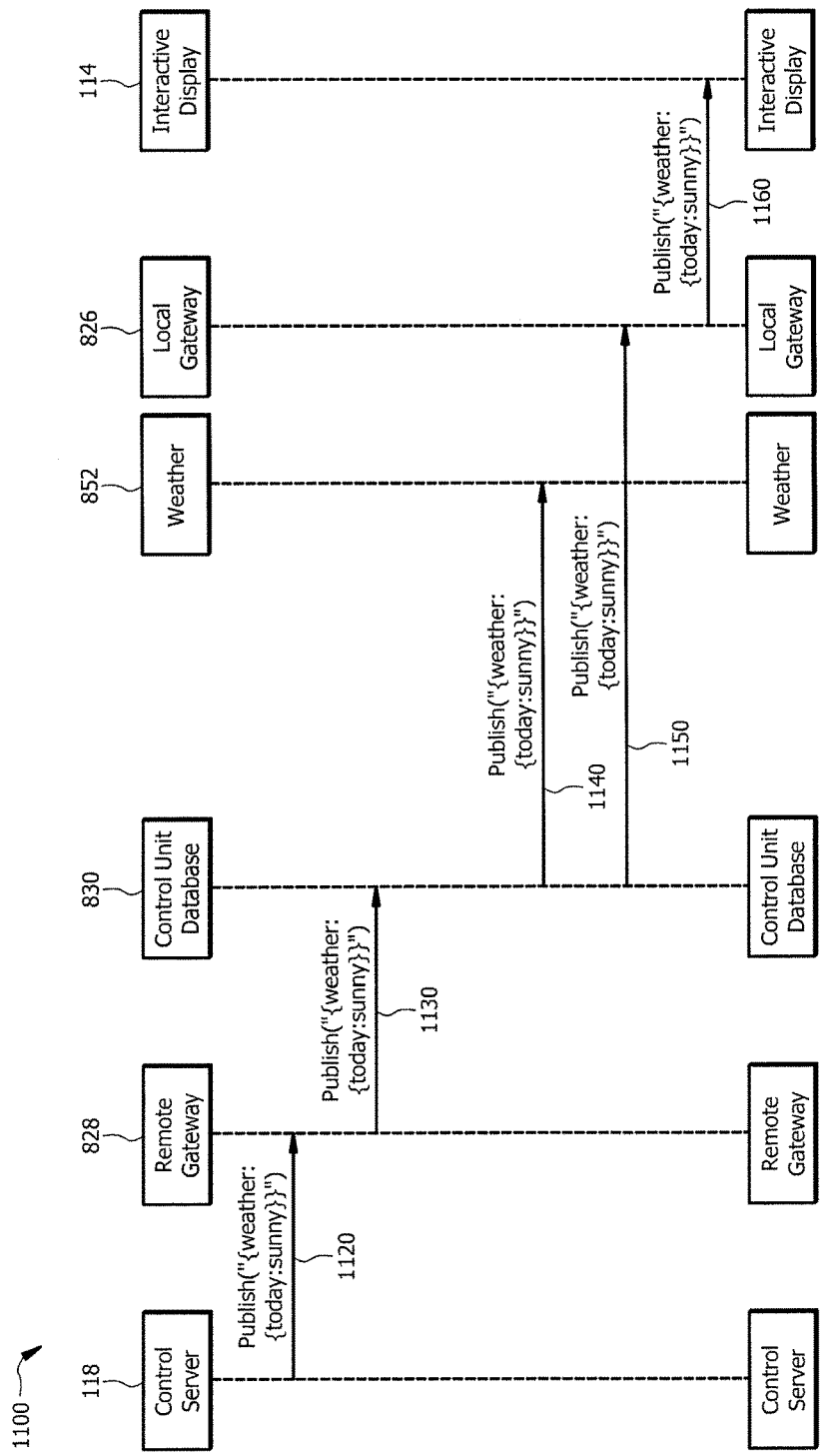
FIG. 11 is a timing diagram illustrating an example method for pushing weather data from an HVAC control server to an HVAC control unit.

FIG. 11 is an example timing diagram 1100 illustrating a method for pushing weather data from an control server 118 to an control unit 102a. Timing diagram 1100 further illustrates the systems and applications 840 of control unit 102a that may handle and communicate data when control server 118 pushes the data to control unit 102a. Embodiments of FIG. 11 illustrate one or more steps that control units 102 may take to ensure the authenticity and accuracy of data provided by control server 118.

Control server 118 may periodically publish weather data 1120 to control unit 102a. The frequency of the weather data may be decided in a number of ways. For example, control server 118 may publish weather data 1120 to control unit 102a according to a default setting. A default setting may instruct control server 118 to send weather data 1120 at the same time every day (e.g., 7:00 a.m.) A user may adjust the default settings according to preferences of the user. For instance, the user may update control server 118 to publish weather data every hour using user device 110 and application 111. In certain embodiments, the user may update the settings by communicating with control unit 102a over HVAC control network 124 and/or LAN 126. In some embodiments, control server 118 may publish weather data 1120 in response to determining that weather data 1120 comprises a severe weather warning affecting the geographic location of control unit 102a.

Control server 118 may communicate weather data 1120 to control unit 102a using control connection 916. Remote gateway 828 may establish and maintain control connection 916 on behalf of control unit 102a. In some embodiments, control unit 102a may publish weather data 1120 to database 830 based on the pub-sub protocol discussed above in FIG. 8. Multiple applications 840 of control unit 102a may then subscribe to the weather data sent from control server 118.

For example, analytics program 846 may receive weather data indicating that a cold front will soon reach the geographic location of control unit 102a. Analytics program 846 may send an alert to user device 110 that a cold front is approaching and it may not be necessary for schedule program 848 to activate HVAC unit 104 to cool the house.

In the illustrated embodiment, interactive display 114 and weather program 852 both subscribe to weather data. Weather program 852 may subscribe to weather data to ensure that the weather data received is accurate. Weather program 852 may verify that the weather data is for the proper geographic location of control unit 102a. Weather program 852 may also determine that the weather data is timely. If control connection 916 is down for a period of time, upon re-establishing connection with control server 118, control unit 102a may receive old weather data. If weather program 852 determines that the weather data is inaccurate, it may take steps to ensure no other applications 840 or devices subscribed to that data use it. Weather program 852 may alert database 830 of the inaccurate weather data and have database 830 delete the report before other applications 840 receive the report. If weather program 852 determines that the report is accurate, other applications 840 and devices may utilize the report.

In timing diagram 1100, interactive display 114 also subscribes to weather data. Database 830 may publish the report to local gateway 826 using publish command 1150. Local gateway 826 may then determine how interactive device 114 is connected to control unit 102a. In some embodiments, interactive display 114 is connected wirelessly over HVAC control network 124 and/or LAN 126. Local gateway 826 may determine what the preferred wireless communication channel is, and publish the weather data to interactive display 114 over the preferred channel using publish command 1160. Interactive display 114 may then receive the report and display the weather data.

In this manner, control unit 102a may efficiently distribute accurate weather data published by control server 118 to a number of applications 840 and devices in the HVAC system. Furthermore, although timing diagram 1100 uses published weather data, any suitable data used by HVAC system 100 may be published by control server 118, received by control unit 102a, authenticated, and transmitted to applications 840 and devices subscribed to the data.

In addition to receiving published data from control server 118, control unit 102a may pull data from control server 118. As described by FIG. 12, control unit 102a may utilize a number of techniques to ensure that the pulled data is received and authenticated in an expedient manner.

Pulling of Server Data

Figure 12:
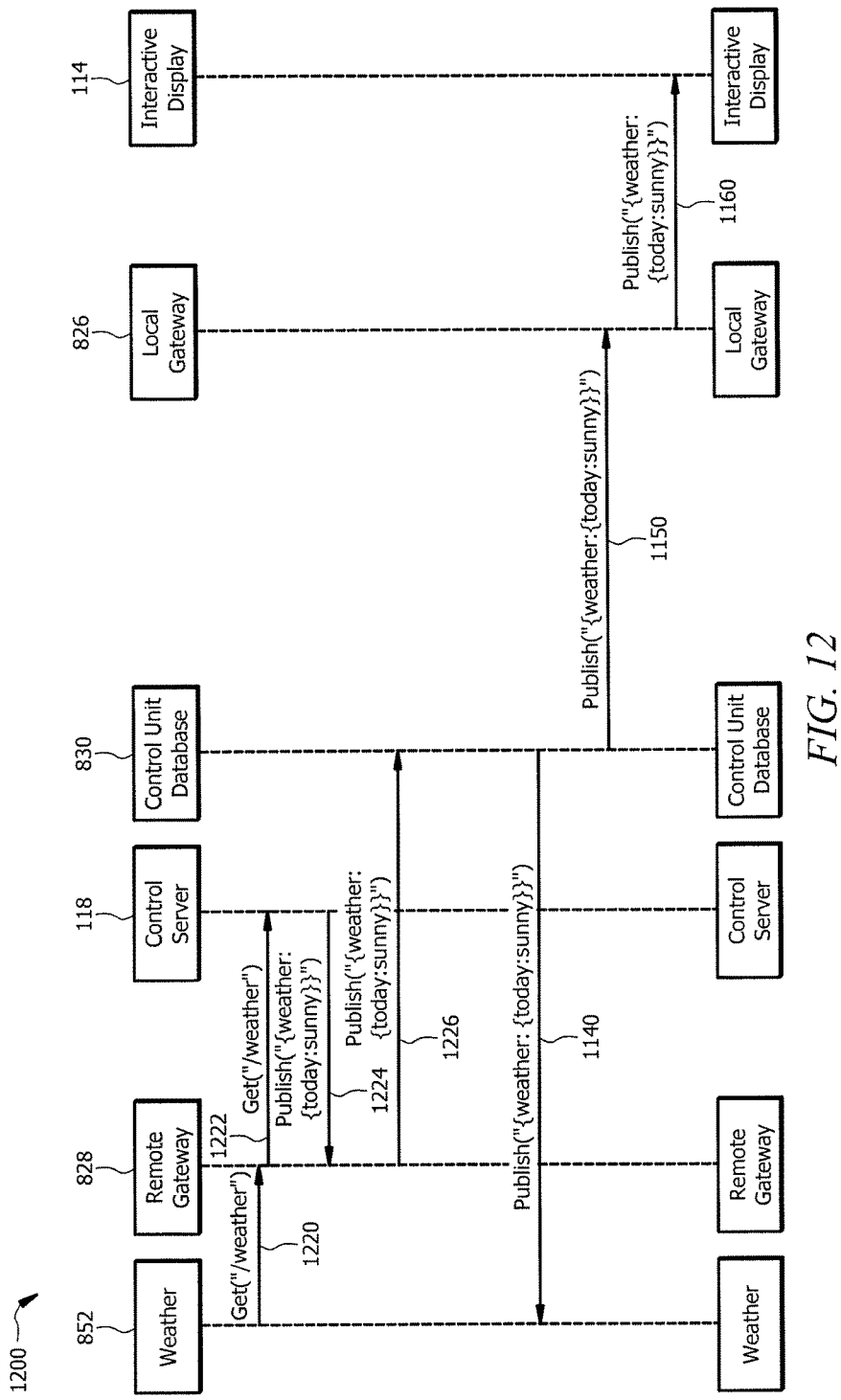
FIG. 12 is a timing diagram illustrating an example method for requesting weather data from an HVAC control server using an HVAC control unit.

FIG. 12 is an example-timing diagram 1200 illustrating a method for pulling a data from control server 118 using control unit 102a. In addition to receiving published data from control server 118 as described in FIG. 11, control unit 102a may pull data from control server 118. To illustrate the techniques utilized by control units 102a, timing diagram is illustrates control unit 102a pulling weather data, however, any suitable type of data may be pulled from control server 118.

Control unit 102a may pull weather data from control server 118 for a number of reasons. If previously received weather data became corrupted during communication or while the report was stored in memory 780, control unit 102a may request another report from control server 118. If previously received weather data included a severe weather report, control unit 102a may pull subsequent weather reports more frequently than normally scheduled.

To request the weather data, weather program 852 may generate pull command 1220. Pull command 1220 may indicate that control unit 102a requests the most recent weather data from control server 118. Pull command 1220 may be sent to remote gateway 828 to forward the command over control connection 916 to control server 118. In some embodiments, control unit 102a may need to conserve communication resources and thus, control unit 102a may only establish notification connection 914 and control connection 916 when necessary. By sending pull command 1220 to remote gateway 828, remote gateway 828 may establish control connection 916 to transmit the pull command 1220.

Control server 118 may receive pull weather command 1222 from remote gateway 828, generate a weather report, and publish weather data 1224 back to remote gateway 828. Control server 118 may transmit weather data 1224 back over the same control connection 916 or a new control connection may be established depending on whether control unit 102a is conserving communication resources.

Once remote gateway 828 receives weather data 1224 from control server 118, remote gateway 828 may publish the weather data to Database 830. Even though weather program 852 issued pull command 1220, the weather data may be communicated using the publish-subscribe protocol described in FIG. 8. This allows other applications 840 and devices to access the most recent weather data in addition to weather program 852. Furthermore, this process may conserve processing resources of control unit 102a by only requiring one application 840 to send a pull message to control server 118 instead of each subscribed application 840 sending a pull message.

When database 830 receives publish command 1226 from remote gateway 828, control unit 102a may conduct an accuracy check on the weather data as described in detail in FIG. 11. Thus, weather program 852 may receive published weather command 1140 and determine its accuracy. If accurate, database 830 may allow all other subscribers to receive the weather data. For example, database 830 may publish the weather report to local gateway 826 using publish command 1150. Local gateway 826 may then publish the weather data to interactive display 114. In this manner, control unit 102a may pull weather data from control server 118 and allow applications 840 and devices subscribed to the data to receive the pulled and verified weather data.

Although the present disclosure has been described with several embodiments, a myriad of changes, variations, alterations, transformations, and modifications may be suggested to one skilled in the art. For example, although the figures depict control units 102a through 102n and example embodiments are illustrated using control unit 102a, one or more of the other control units 102 may perform the actions described using control unit 102a while being similar or different in structure and function. Furthermore, the description of control units 102a through 102n represents any number of components (from 1 through n) and is not necessarily limited to the two depicted control units. It is intended that the present disclosure encompass such changes, variations, alterations, transformations, and modifications as fall within the scope of the appended claims.

The invention claimed is:

1. A system for managing control units in a heating, ventilation, and air-conditioning (HVAC) network, comprising:
a first control unit communicatively coupled to a first plurality of HVAC units and a first interactive display, wherein the first control unit controls HVAC services for a first zone;
a second control unit communicatively coupled to a second plurality of HVAC units and a second interactive display, wherein the second control unit controls HVAC services for a second zone;
wherein, the first control unit is configured to:
connect to the second control unit using a Wi-Fi direct protocol to create an HVAC control network;
connect to the second control unit using a Wi-Fi network generated by a wireless access point;
receive an installation report that indicates the second control unit controls HVAC services for the second zone in response to connecting to the second control unit;
update the first interactive display to show the first and second zones in response to receiving the installation report;
receive a command from the first interactive display over the HVAC control network to adjust a temperature of an identified zone;
determine the identified zone is the second zone in response to receiving the command;
receive an alert indicating the second control unit is disconnecting from the Wi-Fi network; and
communicate the command to the second control unit using the HVAC control network in response to receiving the alert indicating the second control unit is disconnecting from the Wi-Fi network.

2. The system of claim 1, wherein the second control unit is configured to:
receive the command from the first control units; and
transmit the command to the second plurality of HVAC units to adjust the temperature of the second zone.

3. The system of claim 1, wherein
the first control unit is further configured to:
detect a user device connected to the Wi-Fi network;
connect to the user device over the Wi-Fi network;
receive a command from the user device to adjust a temperature of the second zone; and
transmit the command to the second control unit and
the second control unit is further configured to:
receive the command from the first control unit; and
transmit the command to the second plurality HVAC units to adjust the temperature of the second zone.

4. The system of claim 3, wherein the second control unit disconnects from the Wi-Fi network and the HVAC control network; and
the first device is configured to:
detect that the second control unit has disconnected from the Wi-Fi network and the HVAC control network; and
update the first interactive display to show that the second control unit is disconnected from the Wi-Fi network.

5. The system of claim 4, wherein the second control unit alerts the first control unit before disconnecting from the Wi-Fi network and the HVAC control network.

6. The system of claim 4, wherein the first control unit is configured to alert the user device that the second control unit is disconnected from the Wi-Fi network and the HVAC control network.

7. A system for controlling a heating, ventilation, and air-conditioning (HVAC) network, comprising:
  a first control unit communicatively coupled to a first plurality of HVAC units and a first interactive display, wherein the first control unit controls HVAC services for a first zone; and
  a second control unit communicatively coupled to a second plurality of HVAC units and a second interactive display, wherein the second control unit controls HVAC services for a second zone;
  wherein, the first control unit is configured to:
    connect to the second control unit over a Wi-Fi network;
    connect to the second control unit using a Wi-Fi direct protocol to create an HVAC control network;
    receive an installation report that indicates the second control unit controls HVAC services for the second zone in response to connecting to the second control unit;
    update the first interactive display to show the first and second zones in response to receiving the installation report;
    receive a command to adjust a temperature of an identified zone from the first interactive display;
    determine the identified zone is the second zone in response to receiving the command;
    receive an alert indicating the second control unit is disconnecting from the HVAC control network; and
    communicate the command to the second control unit using the Wi-Fi network in response to receiving the alert indicating the second control unit is disconnecting from the HVAC control network.

8. The system of claim 7, wherein the second control unit is configured to:
  receive the command from the first control unit over the Wi-Fi network; and
  transmit the command to the second plurality of HVAC units to adjust the temperature of the second zone.

9. The system of claim 7, wherein the first control unit is further configured to:
  connect to a user device over the Wi-Fi network,
  receive a command from the user device to adjust a temperature of the second zone, and
  transmit the command to the second control unit over the Wi-Fi network; and
  the second control unit configured to:
    receive the command from the first control unit using the Wi-Fi network, and
    transmit the command to the second plurality of HVAC units to adjust the temperature of the second zone.

10. The system of claim 7, wherein the first control unit is further configured to:
  connect to a user device using the Wi-Fi direct protocol,
  receive a command from the user device to adjust a temperature of the second zone using the Wi-Fi direct protocol, and
  transmit the command to the second control unit over the Wi-Fi network; and
  the second control unit configured to:
    receive the command from the first control unit using the Wi-Fi network, and
    transmit the command to the second plurality of HVAC units to adjust the temperature of the second zone.

11. The system of claim 7, wherein the second control unit disconnects from the Wi-Fi network; and
  the first control unit is configured to:
    detect that the second control unit has disconnected from the Wi-Fi networks; and
    update the first interactive display to show that the second control unit is disconnected.

12. The system of claim 11, wherein the second control unit alerts the first control unit that the second control unit is about to disconnect from the Wi-Fi network.

* * * * *